(12) United States Patent
Miyagawa et al.

(10) Patent No.: US 10,717,617 B2
(45) Date of Patent: Jul. 21, 2020

(54) MEDIUM PROCESSING APPARATUS

(71) Applicant: SEIKO EPSON CORPORATION, Tokyo (JP)

(72) Inventors: Tetsuya Miyagawa, Shiojiri (JP); Shingo Waki, Matsumoto (JP); Shota Mizuno, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/453,859

(22) Filed: Jun. 26, 2019

(65) Prior Publication Data

US 2019/0389680 A1    Dec. 26, 2019

(30) Foreign Application Priority Data

Jun. 26, 2018    (JP) ................. 2018-121234

(51) Int. Cl.
*B65H 7/20*    (2006.01)
*B65H 7/12*    (2006.01)
(Continued)

(52) U.S. Cl.
CPC .............. *B65H 7/20* (2013.01); *B65H 5/062* (2013.01); *B65H 7/12* (2013.01); *H04N 1/00588* (2013.01); *H04N 1/00602* (2013.01)

(58) Field of Classification Search
CPC .... B41J 3/4075; B41J 11/0015; B41J 11/006; B41J 11/007; B41J 11/008; B41J 11/703; B41J 2002/16555; B41J 2002/16573; B41J 29/38; B41J 2/0057; B41J 2/155; B41J 2/16585; B41J 2/2114; B41J 3/4071; B41J 3/44; B41J 11/46; B41J 11/48; B41J 11/666; B41J 25/34; B41J 2/1752; B41J 2/1755; B41J 3/50; H04N 1/00567; H04N 1/00676; H04N 1/04; H04N 1/12; H04N 1/401; H04N 1/407; H04N 1/409; H04N 2201/0081
(Continued)

(56) References Cited

U.S. PATENT DOCUMENTS

2004/0017459 A1*   1/2004   Kawaguchi ............ B41J 3/4071
                                                           347/104
2009/0116869 A1*   5/2009   Kotsuka ............. G03G 21/1647
                                                           399/111
(Continued)

FOREIGN PATENT DOCUMENTS

JP    H05155084    6/1993
JP    2012157999   8/2012

*Primary Examiner* — Negussie Worku
(74) *Attorney, Agent, or Firm* — Workman Nydegger

(57) ABSTRACT

A medium processing apparatus includes a processing section performing a process on a sheet-like medium; a transport roller pair including a driving roller and a driven roller, and transporting the medium in a transport path including a region in which the processing section performs a process; a first casing accommodating the processing section and the transport roller pair; a second casing configured to close and open with respect to the first casing; and a displacement mechanism displacing the transport roller pair to a separation position and a contact position. The displacement mechanism displaces the transport roller pair from the contact position to the separation position in conjunction with an operation of opening the second casing.

11 Claims, 12 Drawing Sheets

(51) Int. Cl.
*H04N 1/00* (2006.01)
*B65H 5/06* (2006.01)

(58) Field of Classification Search
USPC .................................. 358/498, 497, 496
See application file for complete search history.

(56) References Cited

U.S. PATENT DOCUMENTS

| | | | | |
|---|---|---|---|---|
| 2009/0297211 A1* | 12/2009 | Kanno | ............... | G03G 21/1853 |
| | | | | 399/111 |
| 2011/0156342 A1* | 6/2011 | Iino | ............... | B65H 3/0684 |
| | | | | 271/10.11 |
| 2011/0157271 A1* | 6/2011 | Terada | ............... | B41J 3/4071 |
| | | | | 347/16 |
| 2011/0235082 A1* | 9/2011 | Mukai | ............... | G03G 15/605 |
| | | | | 358/1.13 |
| 2012/0004086 A1* | 1/2012 | Shirakura | ............... | B65H 45/12 |
| | | | | 493/454 |
| 2012/0086988 A1* | 4/2012 | Hara | ............... | H04N 1/1065 |
| | | | | 358/296 |
| 2012/0086991 A1* | 4/2012 | Hara | ............... | H04N 1/00559 |
| | | | | 358/497 |
| 2012/0182568 A1* | 7/2012 | Isogai | ............... | G03G 15/5004 |
| | | | | 358/1.13 |
| 2012/0194589 A1* | 8/2012 | Hayashi | ............... | B41J 13/025 |
| | | | | 347/14 |
| 2013/0188001 A1* | 7/2013 | Kimura | ............... | B41J 29/02 |
| | | | | 347/108 |
| 2013/0279956 A1* | 10/2013 | Aoki | ............... | G03G 15/2064 |
| | | | | 399/329 |
| 2015/0014917 A1* | 1/2015 | Misawa | ............... | B65H 5/26 |
| | | | | 271/225 |
| 2016/0257136 A1* | 9/2016 | Ueno | ............... | B65H 29/70 |
| 2018/0001682 A1* | 1/2018 | Honoki | ............... | B41J 2/17509 |
| 2018/0029392 A1* | 2/2018 | Matsuzaki | ............... | B41J 2/17523 |
| 2019/0283989 A1* | 9/2019 | Tada | ............... | B65H 3/44 |

* cited by examiner

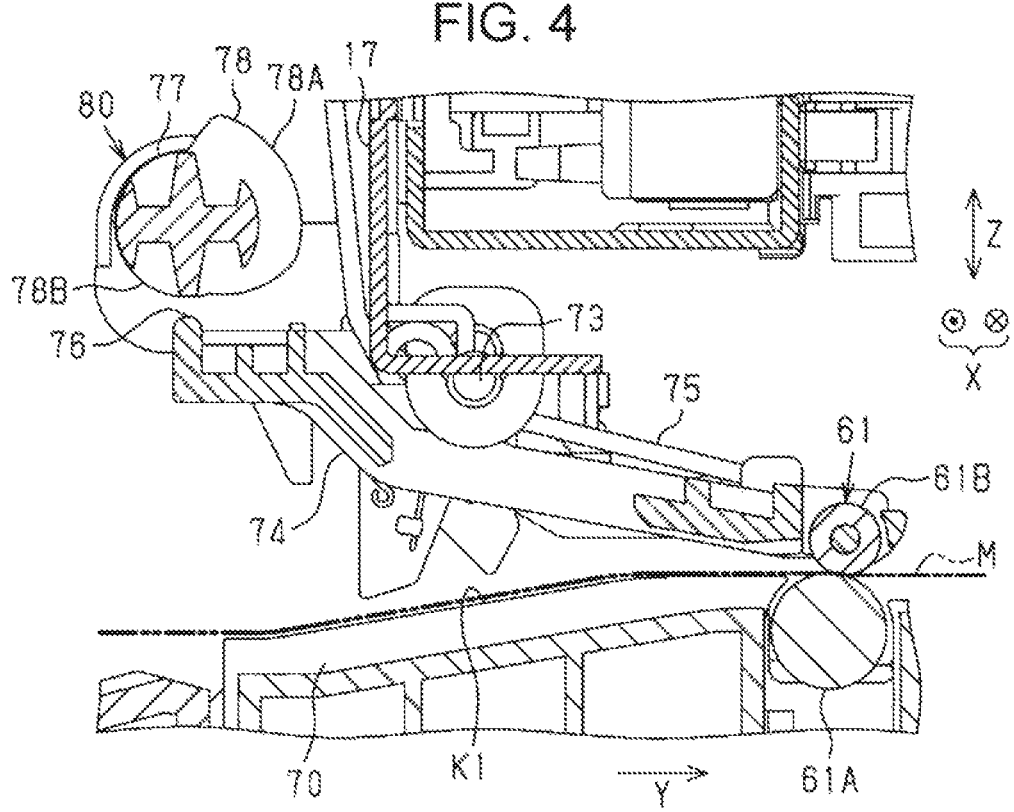
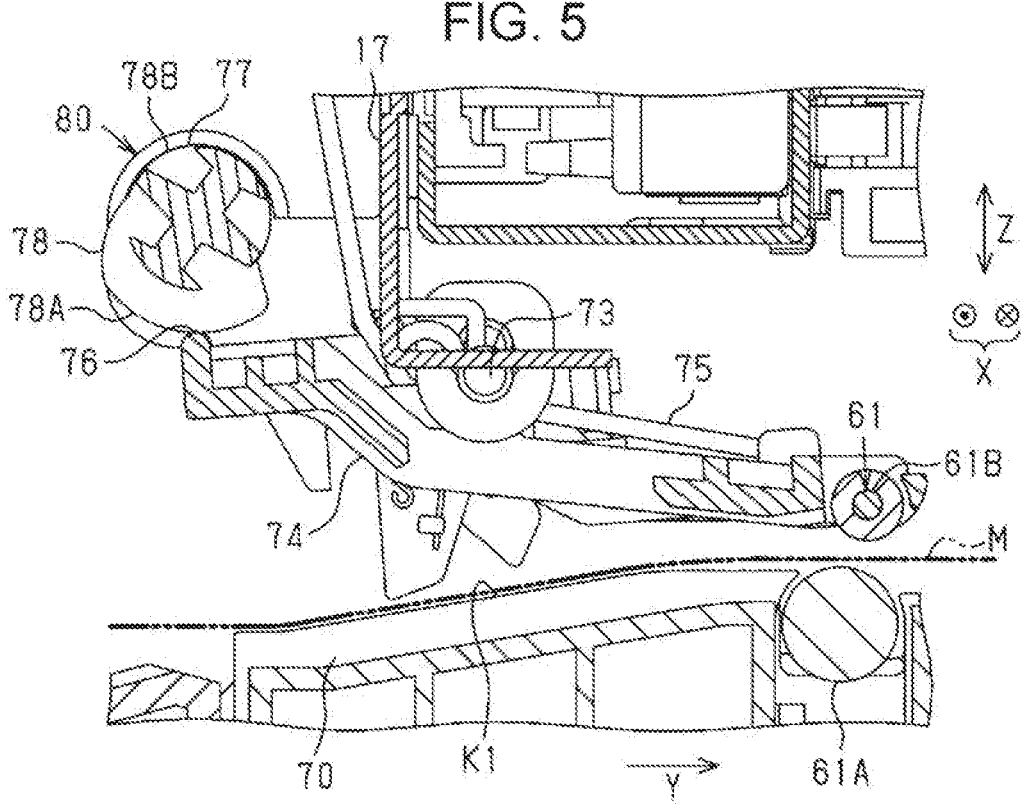

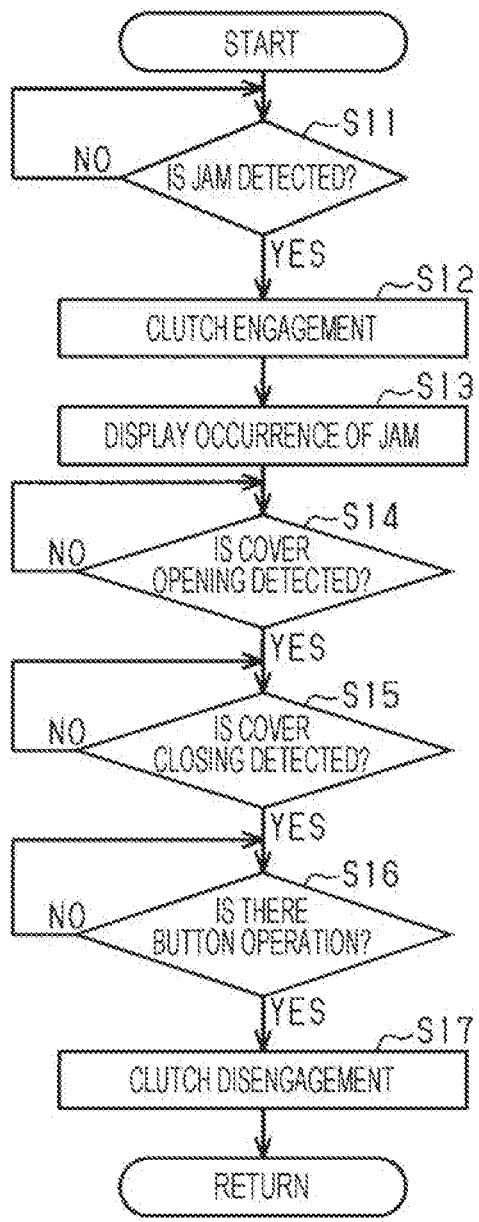

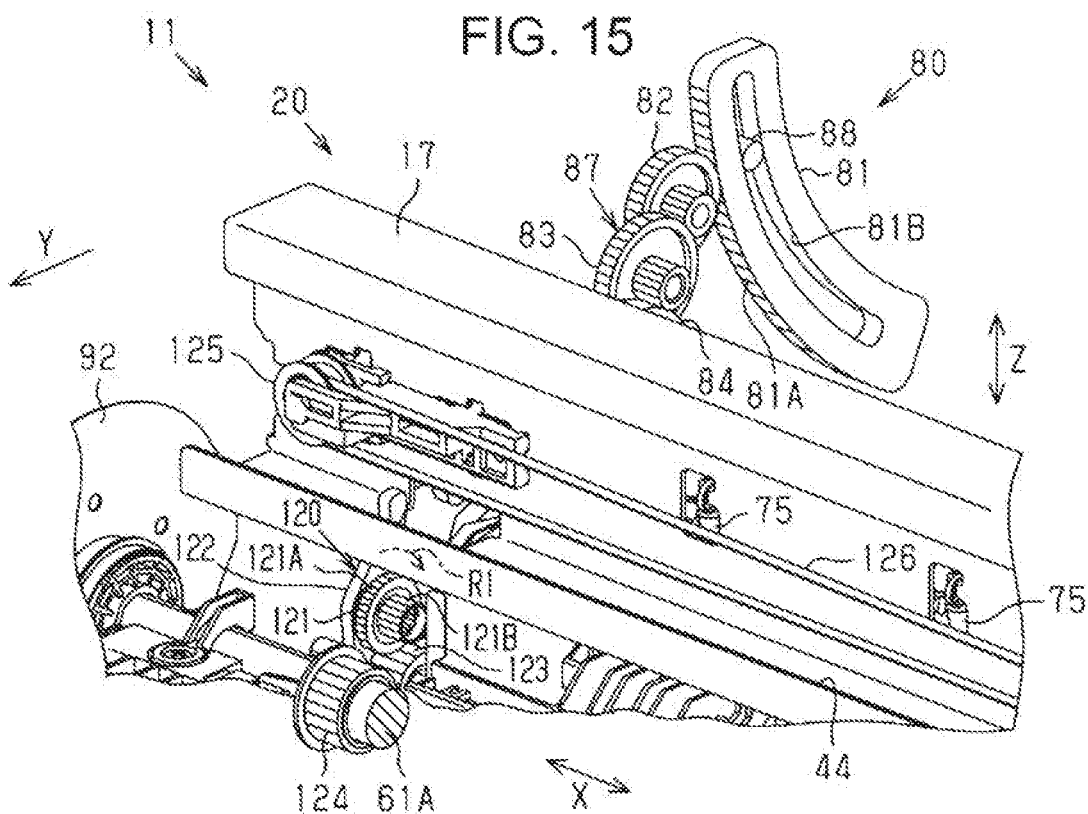
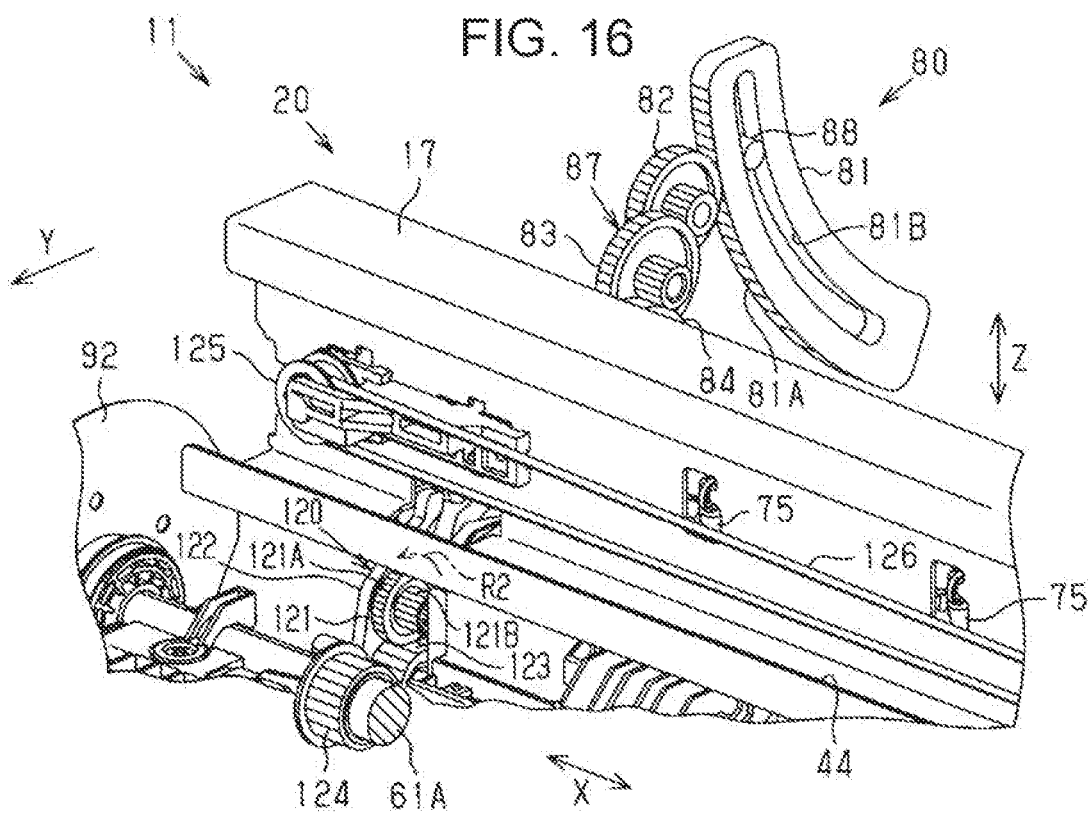

MEDIUM PROCESSING APPARATUS

The present application is based on, and claims priority from JP Application Serial Number 2018-121234, filed Jun. 26, 2018, the disclosure of which is hereby incorporated by reference herein in its entirety.

BACKGROUND

1. Technical Field

The present disclosure relates to a medium processing apparatus that includes a roller transporting, for example, a medium such as a sheet, and performs a process of recording on a transported medium.

2. Related Art

In the related art, as a medium processing apparatus of this type, there has been known a printer including a transporting device transporting a medium such as a sheet, and a recording head (an example of a recording section) performing a recording process for recording characters and images using ink on the transported medium.

JP-A-2012-157999 discloses a printer including a first transporting mechanism that is capable of realizing a nip state in which a medium in a transport path is nipped by a plurality of rollers and a nip releasing state in which the medium is not nipped, and transports the medium in the nip state; a second transporting mechanism transporting a print medium at a most upstream of the transport path; and a transport control section. When printing is performed, the transport control section transports the medium in the nip state in which the first transporting mechanism and the second transporting mechanism nip the medium with rollers. After printing, in a case where the medium before a predetermined period has not been passed is reversely transported, the first transporting mechanism is brought into the nip releasing state, and the medium is transported by the second transporting mechanism. The rollers are displaced into the nip state and the nip releasing state by using an actuator such as a motor.

However, in the printer described in JP-A-2012-157999, when printing is performed, in a case where a jam occurs in a state in which the medium is nipped by the plurality of rollers, when a user who is trying to remove a jammed medium pulls the medium, there is a concern that the medium tears at a nip portion of the roller and eliminating work of the jam becomes troublesome.

SUMMARY

Hereinafter, means of the present disclosure and operation effects thereof will be described.

According to an aspect of the present disclosure, there is provided a medium processing apparatus including: a processing section performing a process on a sheet-like medium; a roller pair including a driving roller and a driven roller, and transporting the medium in a transport path including a region in which the processing section performs a process; a first casing accommodating the processing section and the roller pair; a second casing configured to close and open with respect to the first casing; and a displacement mechanism displacing the roller pair to a separation position and a contact position. The displacement mechanism displaces the roller pair from the contact position to the separation position in conjunction with an operation of opening the second casing.

BRIEF DESCRIPTION OF THE DRAWINGS

FIG. 4 is a side sectional view illustrating a transport roller pair when being in a nipped position.

FIG. 5 is a side sectional view illustrating the transport roller pair when being in a separation position.

FIG. 14 is a flowchart illustrating a release control routine.

FIG. 15 is a partial perspective view illustrating a displacement mechanism in a clutch disengagement state in a fourth embodiment.

FIG. 16 is a partial perspective view illustrating the displacement mechanism in a clutch engagement state.

DESCRIPTION OF EXEMPLARY EMBODIMENTS

First Embodiment

Figure 1:
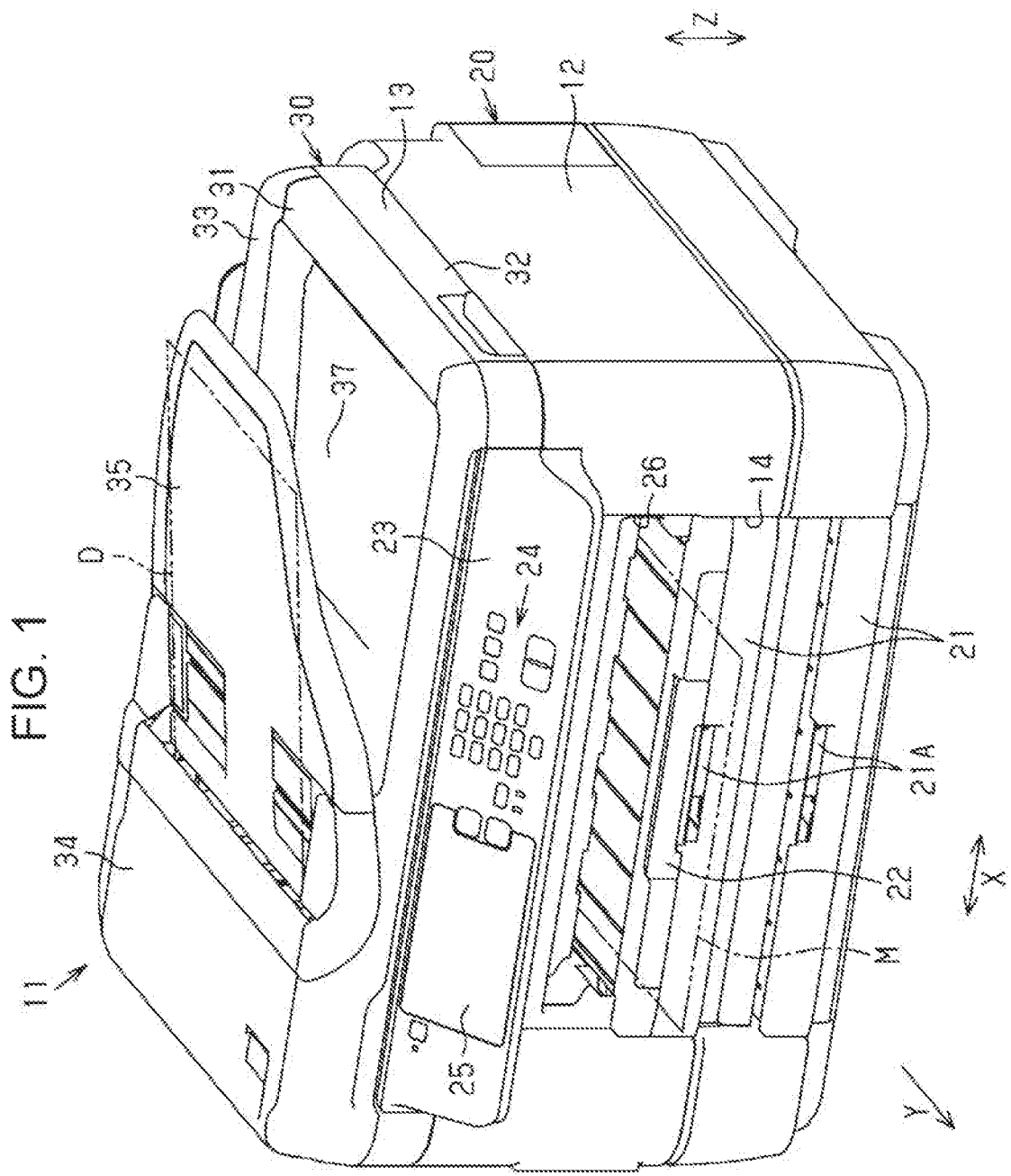
FIG. 1 is a perspective view of a complex apparatus of a first embodiment.

Hereinafter, a medium processing apparatus of a first embodiment will be described with reference to the drawings. The medium processing apparatus of the embodiment is a complex apparatus 11 (multifunction peripheral) including printing and copying mechanisms. In the following description, a vertical direction Z is defined assuming that the complex apparatus 11 illustrated in FIG. 1 is placed on a horizontal plane, and directions along the horizontal plane orthogonal to the vertical direction Z are defined as a width direction X and a transporting direction Y. That is, the width direction X, the transporting direction Y, and the vertical direction Z are each different directions and intersecting each other.

As illustrated in FIG. 1, the complex apparatus 11 includes a recording unit 20 and a reading unit 30. The recording unit 20 and the reading unit 30 are disposed in a state of being vertically overlapped. The reading unit 30 is located above the recording unit 20. The recording unit 20 is capable of recording characters, images such as photographs or the like on a sheet-like medium M. The reading unit 30 is capable of reading characters, images such as photographs or the like recorded on a sheet-like document D. The complex apparatus 11 includes a casing 12 and a cover 13 that opens and closes with pivoting around an end portion of the casing 12 on a back surface side. In the example, the casing 12 is a casing of the recording unit 20. In the example, the reading unit 30 also serves as the cover 13. Therefore, in order to distinguish casings of the recording unit 20 and the reading unit 30, the casing of the recording unit 20 is defined as a first casing 12 and the casing of the reading unit 30 is defined as a second casing 31.

The recording unit 20 includes the first casing 12, cassettes 21 inserted into an insertion hole 14 at a lower portion of the first casing 12 in a detachable state, a discharge tray 22 to which the printed medium M is discharged, and an operation panel 23 provided at a front upper portion of the first casing 12. In the recording unit 20, the operation panel 23, the discharge tray 22, and the cassettes 21 are disposed in this order from above. The cassette 21 has a gripping portion 21A on the front surface, on which a finger of a user is hooked when the user attaches and detaches the cassette 21. The cassette 21 is capable of accommodating a plurality of media M in a stacked state.

The operation panel 23 includes an operation section 24 including a plurality of switches operated to give instructions to the complex apparatus 11, and a display portion 25 on which menus, various massages, and the like are displayed. A discharge port 26, to which the medium M fed from the cassette 21 is discharged after being printed in the recording unit 20, is open between the operation panel 23 and the cassette 21. When printing is performed, the discharge tray 22 is used in an extended state in which the discharge tray 22 is slid forward from an accommodated state illustrated in FIG. 1. The printed medium M discharged from the discharge port 26 is discharged on an upper surface of the discharge tray 22 which is in the extended state.

The reading unit 30 includes a scanner body 32, and a platen cover 33 which is capable of opening and closing with respect to the scanner body 32. Specifically, the second casing 31 includes a casing of the scanner body 32 and a casing of the platen cover 33 capable of opening and closing with respect to the casing thereof. An automatic document feeding device 34 capable of feeding a plurality of documents D sheet by sheet is mounted on the platen cover 33. The automatic document feeding device 34 has a document support 35 capable of setting the plurality of documents D, and feeds the documents D set by the document support 35 sheet by sheet. The document D fed from the automatic document feeding device 34 is read by a reading section 36 (see FIG. 9) in the middle of a feeding path. The read document D is discharged onto a stacker 37 which is formed of a region below the document support 35 on an upper surface of the platen cover 33.

Figure 2:
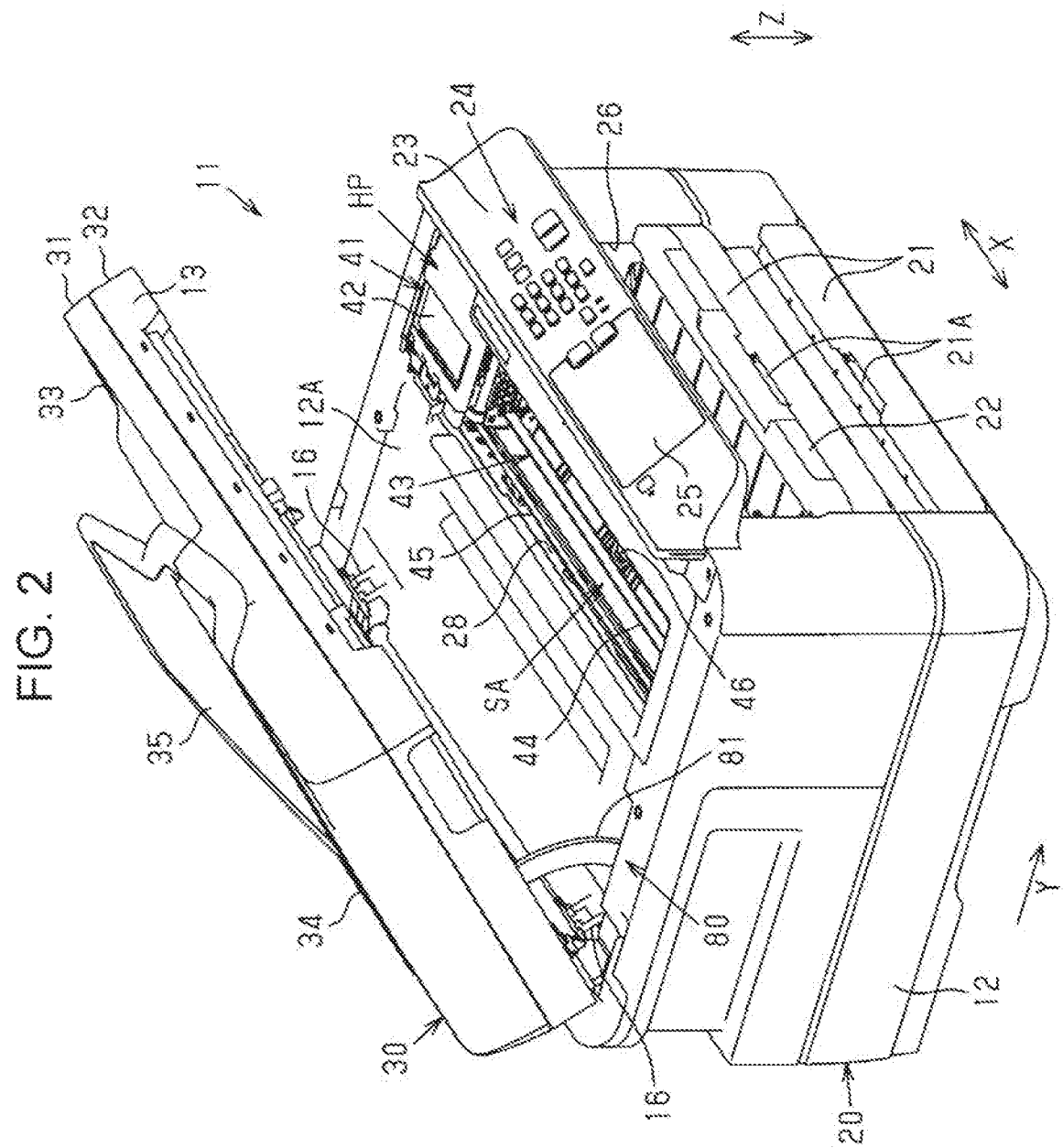
FIG. 2 is a perspective view illustrating a state in which a cover of the complex apparatus is opened.

FIG. 2 illustrates a state in which the cover 13 of the complex apparatus 11 is opened. The upper surface of the first casing 12 is provided with an opening 28 from which a part of a region where the medium M is printed is exposed. From the opening 28, a part of a recording section 41 as an example of a processing section for performing a process on the sheet-like medium M is exposed. Specifically, from the opening 28, a carriage 42 constituting a part of the recording section 41, a scanning region SA of the carriage 42, and a part of a moving mechanism 43 which moves the carriage 42 are exposed. The moving mechanism 43 includes a rail 44 which guides the carriage 42 movably along a scanning axis X, a first encoder 45 which is constituted of a linear encoder for detecting a position of the carriage 42 in the scanning axis X, and the like. In addition, a part of a support table 46 which supports the medium M transported under the scanning region SA in the transporting direction Y, and a part of a transport section 47 (see FIG. 3) which transports the medium M are also exposed from the opening 28.

The carriage 42 is guided by the rail 44 to reciprocate along the scanning axis X. A recording head 48 (see FIG. 3) which ejects a liquid such as ink onto the medium M is provided below the carriage 42. In a moving process of the carriage 42, the recording head 48 ejects ink droplets from a nozzle, and thereby a document or an image is printed on the medium M. In addition, the carriage 42 performs position control and speed control based on a pulse signal output from the first encoder 45 provided on the back surface side thereof. When printing is not performed, the carriage 42 stands by at a home position HP illustrated in FIG. 2. When the carriage 42 is at the home position HP, a maintenance device having a cap (not illustrated) is disposed at a position facing the recording head 48 (see FIG. 3) below the carriage 42. When the carriage 42 stands by at the home position HP, the cap abuts against a nozzle surface where the nozzle of the recording head 48 opens, so that the recording head 48 is capped and viscosity increase of the ink in the nozzle is reduced.

As illustrated in FIG. 2, in the complex apparatus 11, the second casing 31 is attached to the first casing 12 so as to be openable and closable via a hinge pair 16. Specifically, in the complex apparatus 11, the second casing 31 has a pivot shaft disposed along any one side of an upper surface 12A of the first casing 12 by the hinge pair 16, and the second casing 31 pivots about the pivot shaft so as to open and close an upper portion of the first casing 12. In the example, the second casing 31 pivots around the pivot shafts via the hinge pair 16 disposed along one side on the back surface side in the upper surface 12A of the first casing 12 so as to open and close the upper portion of the first casing 12.

The complex apparatus 11 is provided with a displacement mechanism 80 which releases a nip of a transport roller pair 61 as an example of a roller pair, which is described later, for transporting the medium M in conjunction with an operation of opening and closing the second casing 31. The displacement mechanism 80 includes a rack 81 vertically moving in a state of protruding from the upper surface 12A of the first casing 12 in conjunction with the operation of opening and closing the second casing 31 by the user. In the example illustrated in FIG. 2, when the second casing 31 is opened, a part of the rack 81 having a curved shape exposes from an end portion of the upper surface 12A of the first casing 12.

However, when printing is performed, a jam may occur in which the medium M is clogged on the transport path from the cassette 21 to the discharge port 26. Causes of the jam include curling of the medium M, skew in which the medium M is obliquely inclined in the transporting direction Y, cockling in which the medium M absorbing ink expands and waves, and the like.

The complex apparatus 11 includes a function of detecting the jam occurring during the transport of the medium M. In a case where the jam is detected, the complex apparatus 11 urgently stops the print operation and displays a message to the effect that the jam occurs on the display portion 25. The message includes information of an occurrence place of the jam and for prompting removal of the medium M.

When the jam occurs, as illustrated in FIG. 2, the user opens the second casing 31 and inserts his/her hand from the opening 28 of the upper surface 12A of the first casing 12 to pull out the medium M. In this case, when the medium M is in a state of being nipped by the transport roller pair 61, when the user pulls the medium M, the medium M may be torn off at a portion near a nip portion. When the medium M is torn off, it takes time and effort to remove the remaining portion of the medium M. Therefore, in the embodiment, the nip of the transport roller pair 61 is released by the displacement mechanism 80 in conjunction with the operation of opening the second casing 31.

Figure 3:
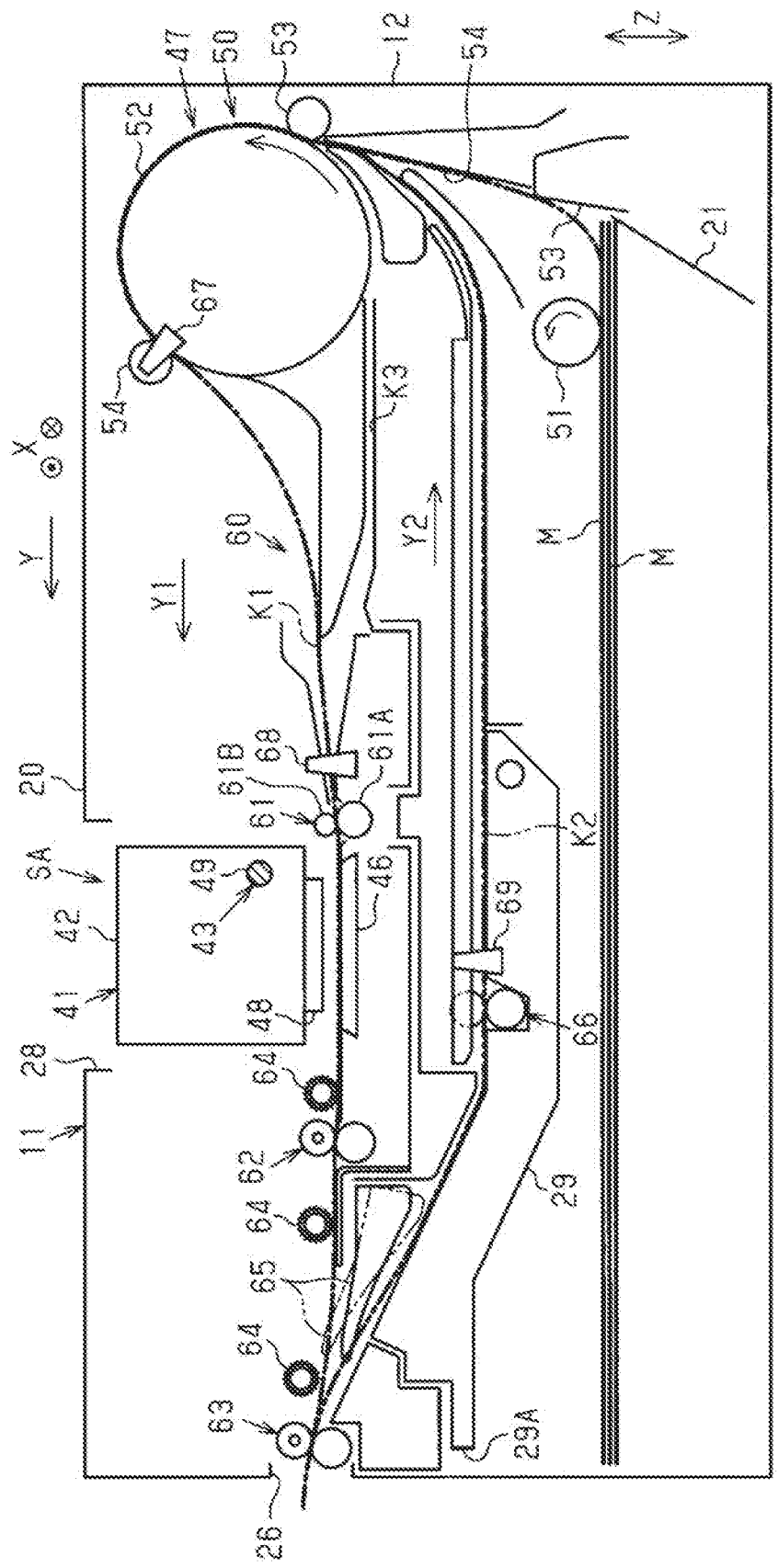
FIG. 3 is a schematic side sectional view illustrating a recording unit.

Next, the recording unit 20 will be described in detail with reference to FIG. 3. FIG. 3 illustrates a schematic side cross section of the recording unit 20. Moreover, in FIG. 3, the reading unit 30 is omitted and only one cassette 21 is illustrated. As illustrated in FIG. 3, in the complex apparatus 11, the transport section 47 which transports the medium M, and the recording section 41 as an example of the processing section for performing a recording process as an example of a process of ejecting the liquid such as ink onto the medium M are accommodated in the first casing 12.

The transport section 47 includes a feeding mechanism 50 for feeding the medium M, and a transporting mechanism 60 for transporting the medium M along a transport path K1 including a region facing the recording section 41. The feeding mechanism 50 feeds the media in the cassette 21 sheet by sheet from an uppermost sheet. The transporting mechanism 60 performs a transporting operation for transporting the medium M fed from the feeding mechanism 50 along a path passing through the region in which the recording section 41 performs recording, and a discharging operation for discharging the medium M on which recording is performed by the recording section 41.

As illustrated in FIG. 3, the feeding mechanism 50 includes a feeding roller 51 for feeding out the uppermost one sheet of the media M in the cassette 21, and an intermediate roller 52 for feeding the medium M fed out by the feeding roller 51 to the recording section 41 where recording (printing) is performed. The intermediate roller 52 rotates in an arrow direction, so that the medium M sent to the intermediate roller 52 is fed to the recording section 41 along the transport path K1 while being nipped between a first roller 53 and a second roller 54 at two portions on an outer peripheral surface thereof. The feeding roller 51 and the intermediate roller 52 are rotated by power of a feeding motor 58 illustrated in FIG. 9.

The transporting mechanism 60 includes the transport roller pair 61, a first discharging roller pair 62, a second discharging roller pair 63, a plurality of floating rollers 64, and the like. The transport roller pair 61 is positioned in an upstream of the recording head 48 of the recording section 41 in the transporting direction Y, and the respective discharging roller pairs 62 and 63 are positioned in a downstream of the recording head 48. The transport roller pair 61 includes a driving roller 61A and a driven roller 61B. The transport roller pair 61 transports the medium M through the first transport path K1 including a region where the recording section 41 performs the recording.

The transport roller pair 61 has a larger contact area with the medium M when the medium M is nipped than those of the discharging roller pairs 62 and 63. This is because the transport roller pair 61 determines the transport position of the medium M by nipping and transporting a portion of the medium M before printing, so that the transport roller pair 61 is necessary to have a larger nipping force than those of the discharging roller pairs 62 and 63 to suppress slippage with the medium M. On the other hand, the respective discharging roller pairs 62 and 63 are, for example, toothed rollers of which a contact area with the medium M is reduced so as not to scrape a print surface to transport the medium M after printing. Therefore, when the user pulls the medium M nipped by the transport roller pair 61 when the jam occurs, the medium M is likely to be torn off at the nip portion of the transport roller pair 61 in which the medium M is nipped with a larger nipping force. Particularly, as a size of the medium is larger, the number of the nip portions in the width direction of the medium M increases, so that when the medium M is pulled when resolving the jam, a portion in the vicinity of the nip portions is likely to be torn off.

Moreover, the recording unit 20 illustrated in FIG. 3 has a duplex printing function. The medium M discharged in a first direction Y1 through the first transport path K1 after printing on a first surface is switched back by a reverse rotation of the second discharging roller pair 63. A flap 65 disposed in the downstream of the recording section 41 in the transporting direction Y is changed from a first posture angle indicated by a solid line in FIG. 3 to a second posture angle indicated by a two-dot chain line in the same drawing, so that the switched back medium M is guided to a reversing second transport path K2 provided on a lower side of the first transport path K1. The guided medium M is transported through the second transport path K2 in a second direction Y2, is reversed via an outer periphery of the intermediate roller 52 again, and then is fed again to the recording section 41 with the first surface facing downward. The recording section 41 performs printing on a second surface of the re-fed medium M. The second transport roller pair 66 for transporting the medium in the second direction Y2 is provided on the second transport path K2.

In addition, as illustrated in FIG. 3, the recording unit 20 includes sensors 67 to 69 for detecting the medium M at a plurality of portions on the transport paths K1 and K2. The sensors 67 to 69 detect the presence of the medium M and output a detection signal at which a signal level switches when detecting a leading end and a trailing end of the medium M. The sensors 67 to 69 detect the leading end and the trailing end of the medium M, so that the position of the medium M on the transport path is grasped. For example, a transport amount of the medium M is measured with the position at the time when the sensor 68 detects the leading end of the medium M fed on the first transport path K1, as an origin, and the position of the medium M on the transport path is grasped by the measured value.

The recording section 41 illustrated in FIG. 3 is a serial recording system. The recording section 41 includes a guide shaft 49 and the carriage 42 capable of reciprocating along the scanning axis X intersecting the transporting direction Y of the medium M guided by the rail 44 illustrated in FIG. 2. The carriage 42 has the recording head 48 at a lower portion facing the transport path K1. The recording head 48 ejects ink while the carriage 42 moves along the scanning axis X, so that characters, images, or the like is recorded on the medium M. The recording head 48 is disposed between the transport roller pair 61 and the first discharging roller pair 62 in the transporting direction Y. The transport roller pair 61 nips a portion of the medium M before recording at a position in the upstream of the recording head 48 in the transporting direction Y to transport the medium M. The support table 46 for supporting the medium M is disposed at a position facing a moving path of the recording head 48 with the first transport path K1 interposed therebetween. Since the medium M is supported by the support table 46, a predetermined gap is held between the recording head 48 and the medium M.

Moreover, a pivot member 29 having a gripping portion 29A is disposed below the second transport path K2, and the user grips the gripping portion 29A and pivots the pivot member 29 downward, so that a part of the second transport path K2 is exposed and removing work of the medium M when the jam occurs in the second transport path K2 can be performed. In addition, the recording unit 20 also includes a reversing third transport path K3 for sending the medium M, which is once discharged to the downstream of the recording section 41 in the transporting direction Y, to the lower side of the intermediate roller 52 in order to feed the medium M again by returning to the first transport path K1. For example, when performing the duplex printing on one sheet, the third transport path K3 is used as a reversing path. In addition, when a plurality of sheets of the media M are continuously fed and the duplex printing of the plurality of sheets is performed, the second transport path K2 is used as the reversing path.

Next, detailed configurations of the transport roller pair 61 will be described with reference to FIG. 4. The transport roller pair 61 includes the driving roller 61A rotatably supported at a height position at which the medium M guided by a medium guide member 70 is capable of being supported, and the driven roller 61B disposed at a position above the driving roller 61A. The driving roller 61A is driven by power of a transporting motor 71 (see FIG. 9) to rotate.

The driven roller 61B is rotatably supported at a tip end portion of a holding member 74 as an example of a holder rotatably supported around a shaft portion 73 with respect to a frame 17 in the downstream in the transporting direction Y. The holding member 74 is pivotably supported, in a predetermined angle range, around the shaft portion 73 with respect to the frame 17 assembled in the first casing 12. The shaft portion 73 is disposed in a direction in which an axis line thereof is parallel to the scanning axis X. As illustrated in FIG. 4, the holding member 74 is pressed in a clockwise direction of FIG. 4 around the shaft portion 73 by a spring 75 as an example of a first press member. That is, the spring 75 is in a state of being pressed toward a contact position side on which the driven roller 61B is in contact with the driving roller 61A. The medium M is nipped between the driving roller 61A and the driven roller 61B by the pressing force of the pressed driven roller 61B caused by pressing thereof. A lower surface of the holding member 74 is a guide surface for guiding the fed medium M to the nip position of the transport roller pair 61. Moreover, the spring 75 may be a torsion coil spring illustrated in FIG. 4, but may be a coil spring.

The transporting motor 71 (see FIG. 9), which is a power source of the driving roller 61A, is an electric motor capable of being driven in forward and reverse directions. When the transporting motor 71 is driven to rotate in the forward direction, the driving roller 61A rotates in the clockwise direction in FIG. 4, which can transport the medium M to the downstream in the transporting direction Y. In addition, when the transporting motor 71 is driven to rotate in the reverse direction, the driving roller 61A reversely rotates in a counterclockwise direction in FIG. 4, which can reversely transport the medium M to the upstream in the transporting direction Y. The reverse rotation of the driving roller 61A is used for a skew removing operation according to the reverse transport of the medium M, for example, in order to correct the skew in which the medium M is inclined in the transporting direction Y in the course of feeing the medium M. Moreover, in the recording unit 20 adopting the skew removing operation not according to the reverse transport of the medium M, it is not necessary for the driving roller 61A to rotate in the reverse direction.

As illustrated in FIG. 4, an end portion of the holding member 74 in the upstream in the transporting direction Y is a cam follower 76, and a cam shaft 77 is disposed in the vicinity of a position above the cam follower 76 in a direction in which an axial direction thereof matches the width direction X. The cam shaft 77 is pivotably supported with respect to the frame 17. The cam shaft 77 includes a plurality of eccentric cams 78 capable of engaging with the cam follower 76 at a portion corresponding to the holding member 74 supporting the driven roller 61B in the axial direction. The eccentric cam 78 has an outer peripheral surface shape of which a distance in the radial direction from an axial center to the outer peripheral surface varies depending on a position in the circumferential direction. The eccentric cam 78 includes a cam surface 78A having a relatively long distance in the radial direction from the axial center to the outer peripheral surface, and a non-engagement surface 78B having a distance shorter than that of the cam surface 78A.

As illustrated in FIG. 4, in a state in which the non-engagement surface 78B of the eccentric cam 78 and the cam follower 76 face each other, the holding member 74 pivots in the clockwise direction in the same drawing around the shaft portion 73 with the pressing force of the spring 75, and the driven roller 61B is disposed at the nip position abutting against the driving roller 61A. When the transport roller pair 61 is at the nip position, the transport roller pair 61 nips the medium M with a predetermined pressing pressure. For example, when the jam occurs, the medium M is in a state of being nipped by a predetermined pressing pressure by the transport roller pair 61 with the pressing force of the spring 75, so that when the user pulls out the medium M while being in the nipped state, there is a concern that the medium M is torn off around the nip portion. Particularly, the longer a width dimension of the medium M, the more the number of nip portions at which the medium M is nipped by the transport roller pair 61 increases, so that the medium M having a lager medium side is likely to be torn off when the jam occurs.

As illustrated in FIG. 5, when the eccentric cam 78 rotates from a first rotation angle illustrated in FIG. 4 to a second rotation angle illustrated in FIG. 5, the cam surface 78A abuts against the cam follower 76 and presses a rear end portion of the holding member 74 downward against the pressing force of the spring 75. As a result, the holding member 74 pivots around the shaft portion 73 in the counterclockwise direction in FIG. 5, so as to be disposed at a release position at which the driven roller 61B is displaced upward to be separated from the driving roller 61A, and the nip state is released. In the embodiment, when the jam occurs, in order to release the jam by the user, the eccentric cam 78 rotates from the first rotation angle illustrated in FIG. 4 to the second rotation angle illustrated in FIG. 5 via the displacement mechanism 80 in conjunction with the operation of opening the second casing 31. As a result, the driven roller 61B moves from the nip position illustrated in FIG. 4 to the release position illustrated in FIG. 5, so that the transport roller pair 61 displaces from the contact position to the separation position. As described above, the driven roller 61B is held by the holding member 74 so as to be capable of contacting and separating with respect to the driving roller 61A.

Figure 6:
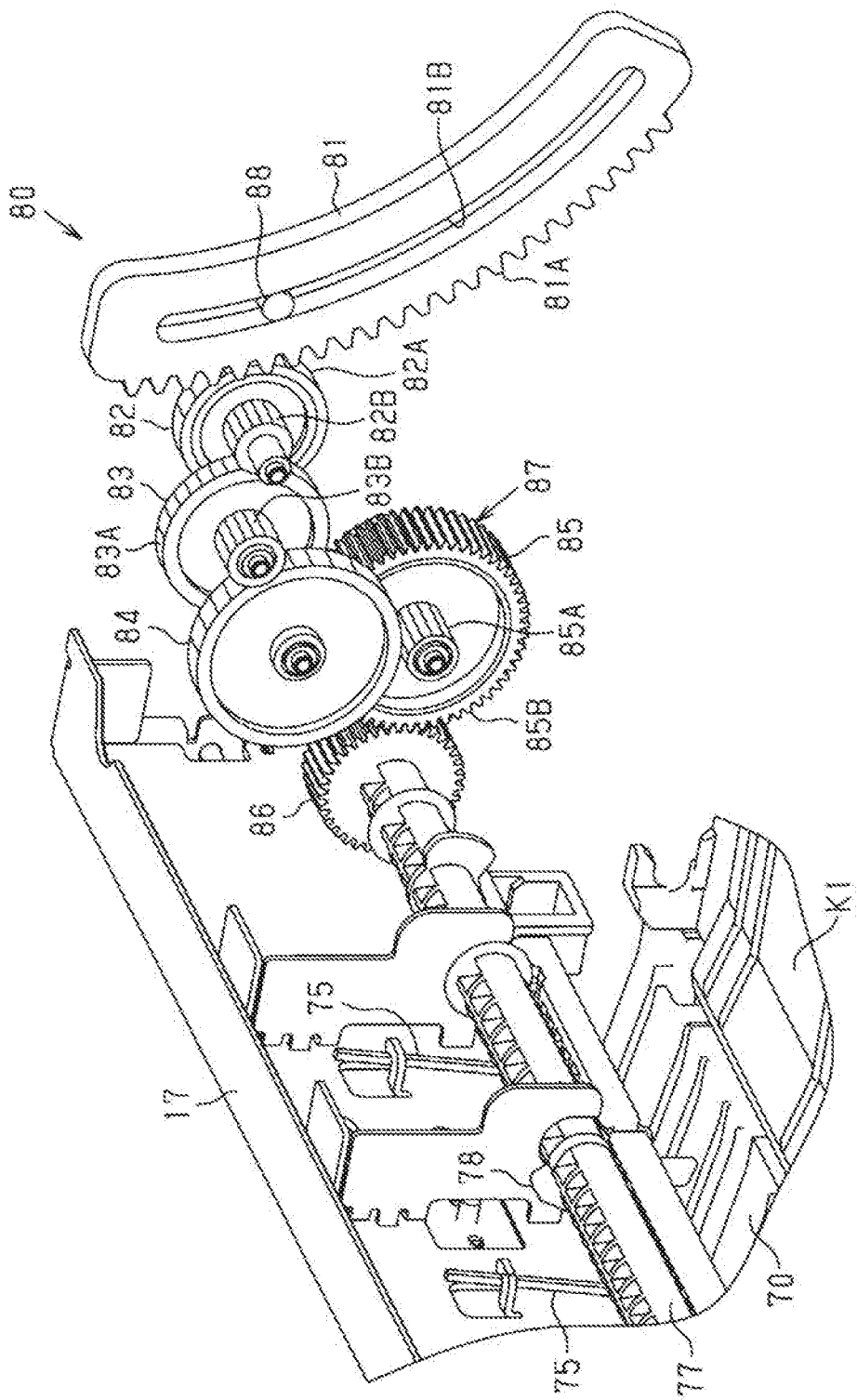
FIG. 6 is a perspective view illustrating a displacement mechanism.

Next, detailed configurations of the displacement mechanism 80, which displaces the transport roller pair 61 between the separation position and the contact position in conjunction with the opening and closing operation of the second casing 31, will be described with reference to FIGS. 6 to 8. As illustrated in FIG. 6, the displacement mechanism 80 includes the rack 81 capable of displacing in conjunction with the opening and closing operation of the second casing 31, and a gear mechanism 87 including a pinion gear 82 meshing with a tooth portion 81A of the rack 81 and a plurality of gears 83 to 86. That is, the displacement mechanism 80 includes a rack-and-pinion mechanism constituted by the rack 81 and the pinion gear 82. An upper end portion of the rack 81 is connected to the second casing 31. The gear 86 of the gear mechanism 87, which is located on an output side opposite to the pinion gear 82 on an input side on a power transmitting path thereof, is provided at a shaft end portion of the cam shaft 77. The first gear 83, the second gear 84, and the third gear 85 are interposed in this order from the input side between the pinion gear 82 and the gear 86. The gear 86 rotates, so that the eccentric cam 78 protruding from the cam shaft 77 rotates together with the cam shaft 77.

The pinion gear 82 is a two-stage gear, and includes a first gear portion 82A having a large diameter and a second gear portion 82B having a small diameter. The tooth portion 81A of the rack 81 meshes with the first gear portion 82A having a large diameter of the pinion gear 82, and the second gear portion 82B having a small diameter meshes with the first gear 83. The first gear 83 is also a two-stage gear, a first gear portion 83A having a large diameter meshes with the pinion gear 82, and a second gear portion 83B having a small diameter meshes with the second gear 84. The second gear 84 meshes with a first gear portion 85A having a small diameter of the third gear 85 that is the two-stage gear, and a second gear portion 85B having a large diameter of the third gear 85 meshes with the gear 86 provided at the end portion of the cam shaft 77. As illustrated in FIG. 6, the plurality of eccentric cams 78 protrude from the cam shaft 77 extending in the width direction X at intervals in the axial direction. When the cam shaft 77 rotates, the plurality of eccentric cams 78 abut against the corresponding cam follower 76 of the holding member 74 synchronously, so that the transport roller pair 61 is switched from the nipped position to the separation position.

Figure 7:
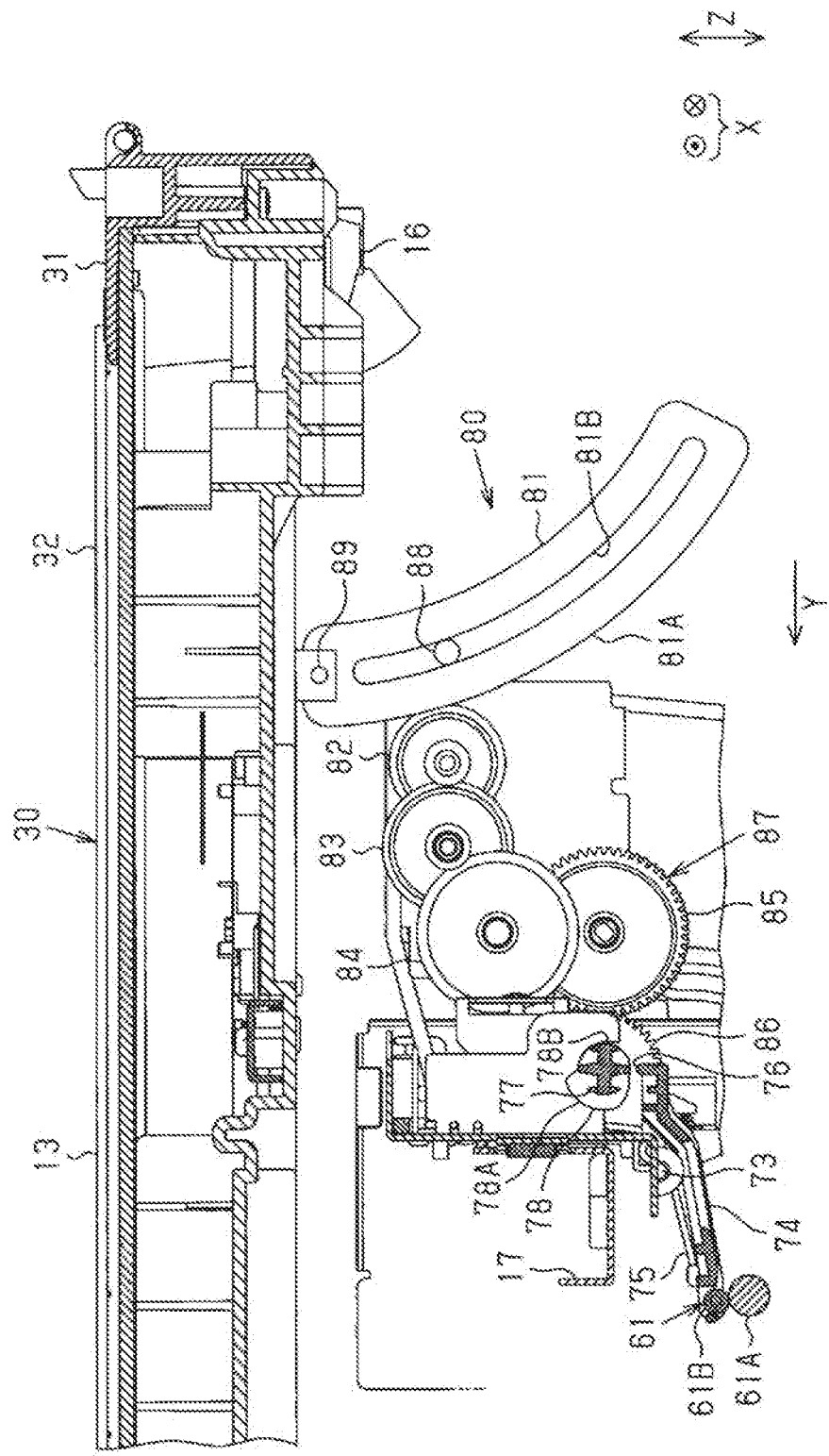
FIG. 7 is a side sectional view illustrating the displacement mechanism in a cover closed state.
Figure 8:
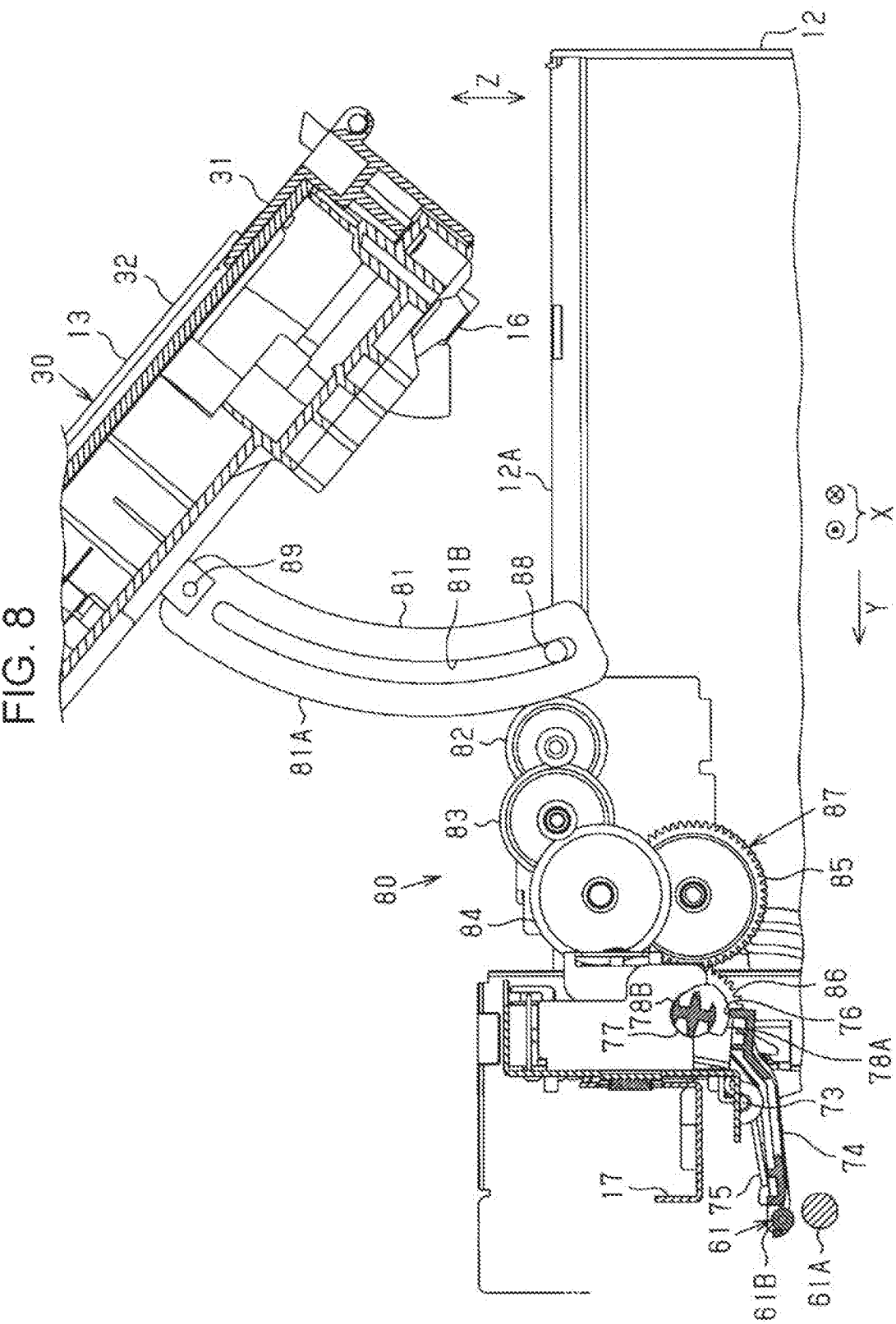
FIG. 8 is a side sectional view illustrating the displacement mechanism in a cover open state.

As illustrated in FIGS. 6 to 8, the rack 81 is formed of a curved plate material, and the tooth portion 81A is formed along an outer periphery of a convex curved surface. A guide hole 81B curved along the curved shape of the tooth portion 81A is open on a side surface of the rack 81 along a width center line thereof. The tooth portion 81A vertically moves to draw a movement locus, which is capable of meshing with the pinion gear 82 while the rack 81 is guided by a support pin 88 inserted into the guide hole 81B.

As illustrated in FIGS. 7 and 8, the upper end portion of the rack 81 is connected to the second casing 31. Specifically, the upper end portion of the rack 81 is connected to an inner surface of the second casing 31 via a connecting portion 89. As illustrated in FIG. 7, in a state in which the second casing 31 is closed, the rack 81 is in a state of being moved downward, and in this case, the eccentric cam 78 is located at the first rotation angle at which the non-engagement surface 78B faces the cam follower 76 of the holding member 74. Therefore, in a state in which the second casing 31 is closed, the driven roller 61B abuts against the driving roller 61A with a predetermined pressing pressure by the pressing force of the spring 75, and the transport roller pair 61 is disposed at the contact position.

On the other hand, as illustrated in FIG. 8, when the second casing 31 is opened, the rack 81, of which the upper end portion is connected to the inner surface of the second casing 31 via the connecting portion 89, moves upward in conjunction with the operation of opening the second casing 31. The pinion gear 82 meshing with the tooth portion 81A is rotated by the upward movement of the rack 81. The gear 86 is rotated via the rotation of respective gears 83 to 85 constituting the gear mechanism 87 due to the rotation of the pinion gear 82, so that the cam shaft 77 rotates. As a result, the cam surface 78A of the eccentric cam 78 presses the cam follower 76 downward against the pressing force of the spring 75. Therefore, the holding member 74 rotates in the counterclockwise direction from the first rotation angle illustrated in FIGS. 4 and 7, and is disposed at the second rotation angle illustrated in FIGS. 5 and 8, so that the driven roller 61B is displaced upward and the transport roller pair 61 is disposed at the separation position. As described above, when the second casing 31 is opened, the displacement mechanism 80 displaces the transport roller pair 61 to the separation position against the pressing force of the spring 75.

When the second casing 31 is fully opened by the function of the hinge 16, the second casing 31 stops at a predetermined angle with respect to the upper surface 12A of the first casing 12. The predetermined angle is an angle formed between the upper surface 12A of the first casing 12 and the inner surface of the second casing 31, and is substantially 45 degrees to 50 degrees. A gear ratio of the displacement mechanism 80 is set based on a moving distance of the rack 81 and a necessary pivot amount of the eccentric cam 78 when the second casing 31 pivots from a fully closed state to a fully open state. Under the predetermined gear ratio of the displacement mechanism 80, the pivot amount of the eccentric cam 78 required for displacing the driven roller 61B by a displacement amount required for contact and separation of the driven roller 61B corresponds to the moving distance of the rack 81. The moving distance of the rack 81 according to opening and closing of the second casing 31 is longer than the distance of the contact and the separation of the transport roller pair 61. That is, the displacement mechanism 80 is a reduction gear mechanism. Therefore, an operating force required to open the second casing 31 can be small, in spite of the configuration in which the second casing 31 is opened against the pressing force of the spring 75. Since the reading unit 30 is a relatively heavy object accommodating the reading section 36 illustrated in FIG. 9 in the second casing 31, a cam (not illustrated) capable of holding the second casing 31 at a plurality of stages of opening degrees in an angle range until the second casing 31 is fully opened, and a spring (not illustrated) for pressing the second casing 31 to the opening side are built in the hinge 16. The second casing 31 is pressed toward the opening side by the spring built in the hinge 16, so that when the user opens the second casing 31, the second casing 31 is operated against the pressing force of the spring 75, but the operating force is relatively small.

Next, electric configurations of the complex apparatus 11 will be described with reference to FIG. 9. The complex apparatus 11 includes a control section 90 for controlling the recording unit 20 and the reading unit 30. The control section 90 is electrically coupled to a cover sensor 91, the sensors 67 to 69, the first encoder 45, and a second encoder 92 as an input system. In addition, the control section 90 is electrically coupled to the recording head 48, a carriage motor 93 constituting the moving mechanism 43 for moving the carriage 42, the feeding motor 58, and the transporting motor 71 as an output system.

The control section 90 includes a CPU 95, a memory 96, a first counter 97, a second counter 98, and a detection section 99. The CPU 95 performs recording control by the recording unit 20 and reading control by the reading unit 30 by executing a program stored in the memory 96.

The cover sensor 91 detects opening and closing of the second casing 31. The cover sensor 91 is, for example, turned off in a state in which the second casing 31 is in the closed state, and is turned on in a state in which the second casing 31 is in the open state. The sensors 67 and 68 detect the medium M in a region before the fed medium M reaches a position facing the recording head 48. In addition, the sensor 69 detects the medium M on the second transport path K2.

The first encoder 45 outputs a pulse signal including the number of pulses proportional to the moving amount of the carriage 42. The control section 90 grasps a moving direction of the carriage 42 based on a phase difference between two-phase pulse signals input from the first encoder 45. Every time a pulse edge of the pulse signal from the first encoder 45 is detected with the home position HP of the carriage 42 as an origin, the first counter 97 counts an increment of a counted value when the carriage 42 moves forward, and counts a decrement of a counted value when the carriage 42 moves backward. Therefore, the first counter 97 counts a counted value indicating a position of the carriage 42 in the scanning axis X. The control section 90 grasps a carriage position that is the position of the carriage 42 in the scanning axis X from counted value of the first counter 97 with the home position HP as the origin.

The second encoder 92 is constituted of a rotary encoder that outputs a pulse signal including the number of pulses proportional to the transport amount by which the transport section 47 transports the medium M. The second counter 98 counts a pulse edge of a pulse signal from the second encoder 92, and acquires a counted value indicating the transport amount of the medium M with reference to the time when the sensor 68 detects the leading end of the medium M. The control section 90 grasps the transport position that is a position of the medium M in the transporting direction based on counted value of the second counter 98.

The detection section 99 detects the jam of the medium M. The detection section 99 detects the jam of the medium M on the transport paths K1 and K2 based on the detection state of the sensor 68 and the transport amount of the medium M grasped from the counted value of the second encoder 92. Although the feeding motor 58 is driven by a sufficient driving amount for completion of feeding of the medium M, the detection section 99 detects the jam occurring in the medium M in the middle of feeding as the sensors 67 and 68 do not detect the medium M. In addition, when discharging the medium M, although the transporting motor 71 is driven by a sufficient driving amount for completion of discharging the medium M, the detection section 99 detects the jam occurring in the medium M in the middle of discharging as the sensors 67 and 68 detect the medium M. Furthermore, during the movement of the carriage 42 in the printing, the detection section 99 detects the jam occurred due to the contact between the carriage 42 and the medium M as a current value of the carriage motor 93 exceeds a threshold indicating a state in which an excessive load is applied to the carriage 42. In a case where the detection section 99 detects the jam, the control section 90 stops the recording operation by the recording unit 20. In addition, when the jam is detected, the control section 90 causes the display portion 25 to display the occurrence of the jam, the occurrence place of the jam, a message for prompting jam clearance.

Next, an operation of the complex apparatus 11 will be described with reference to FIGS. 4 to 9. The user operates an input device of a host device (both are not illustrated) to input printing condition information and perform an operation of instructing the printing. Alternatively, the user operates the operation section 24 of the operation panel 23 of the complex apparatus 11 to input the printing condition information and then perform an operation of instructing the printing. Upon receiving the instruction of the printing together with image data of a printing target, the control section 90 in the complex apparatus 11 performs the recording control to perform recording on the medium M based on the instructed image data and the printing condition information. In addition, the user sets the document D in the reading unit 30 and operates a copy button in the operation section 24, thereby instructing the complex apparatus 11 to copy the document. The control section 90 in the complex apparatus 11 controls the recording unit 20 and performs the recording control to perform recording a read image of the document D on the medium M based on the image data obtained by reading the document D by the reading section 36 and the reading condition information.

When the detection section 99 detects the jam during printing, the control section 90 urgently stops the print operation and causes the display portion 25 to display the occurrence of the jam, a message for prompting jam clearance, and the like. Upon seeing the message on the display portion 25 and knowing the occurrence of the jam, the user opens the second casing 31, for example, to a predetermined angle. The second casing 31 is in a state of being pressed toward the opening direction side by the spring built in the hinge 16, so that the operating force required to open the second casing 31 to a predetermined opening degree is relatively small. When the user performs work for removing the jammed medium M, the second casing 31 is opened to a maximum opening degree, so that the user can easily perform the work.

When the user opens the second casing 31 from the closed state illustrated in FIG. 7 to the state illustrated in FIG. 8, the rack 81 of which the upper end portion is connected to the inner surface of the second casing 31 via the connecting portion 89 moves upward in conjunction with the opening operation of the second casing 31. When the second casing 31 is opened to the maximum opening degree, the cam shaft 77 rotates to the second rotation angle, at which the cam surface 78A of the eccentric cam 78 presses the cam follower 76 of the holding member 74, via the displacement mechanism 80. As a result, when the user opens the second casing 31 to a predetermined angle for jam clearance, the transport roller pair 61 displaces from the contact position to the separation position. Therefore, even if the user pulls the medium M by inserting his/her hand from the opening 28 of the upper surface 12A of the first casing 12, the medium M is relatively easily removed without being torn off.

According to the embodiment described above, the following effects can be obtained.

(1) The recording section 41 for performing recording on the sheet-like medium M, the transport roller pair 61 including the driving roller 61A and the driven roller 61B, and transporting the medium M through the transport path including the region in which recording is performed by the recording section 41, the first casing 12 accommodating the recording section 41 and the transport roller pair 61, and the second casing 31 capable of opening and closing with respect to the first casing 12 are provided. Furthermore, the complex apparatus 11 includes the displacement mechanism 80 displacing the transport roller pair 61 to the separation position and the contact position. The displacement mechanism 80 displaces the transport roller pair 61 from the contact position to the separation position in conjunction with the operation of opening the second casing 31. Therefore, when the jam of the medium M occurs, when the second casing 31 is opened to remove the jammed medium M, the transport roller pair 61 is separated and the nip of the medium M is released, so that the medium M can be relatively simply removed. Therefore, it is easy to remove the medium M by opening the second casing 31 when the jam occurs, and a dedicated power source such as an actuator for contacting and separating the transport roller pair 61 is not necessarily required, so that the manufacturing cost can be reduced.

(2) The displacement mechanism 80 displaces the transport roller pair 61 from the separation position to the contact position in conjunction with the operation of closing the second casing 31. Therefore, after the user removes the jammed medium M, when the second casing 31 is closed, the transport roller pair 61 displaces from the separation position to the contact position in conjunction with the closing operation. Therefore, when a process is performed on the medium M thereafter, the medium M can be transported by the transport roller pair 61.

(3) The spring 75 as an example of the first press member pressing the transport roller pair 61 to the contact position is provided, and when the second casing 31 is opened, the displacement mechanism 80 displaces the transport roller pair 61 to the separation position against the pressing force of the spring 75. Therefore, when the second casing 31 is opened, the transport roller pair 61 can be separated against the pressing force of the spring 75, and when the second casing 31 is closed, the medium M can be nipped with an appropriate nip pressure according to the pressing force of the spring 75.

(4) The displacement mechanism 80 includes the rack 81 displacing in accordance with the displacement of the second casing 31, and the pinion gear 82 meshing with the rack 81. The transport roller pair 61 includes the driving roller 61A and the driven roller 61B. The holding member 74 as an example of the holder that holds the driven roller 61B so as to be displaceable between the separation position and the contact position is provided. The displacement of the rack 81 is transmitted to the holding member 74 via the pinion gear 82, so that the displacement mechanism 80 performs the separation and contact of the transport roller pair 61. Therefore, the displacement is transmitted to the holder via the meshing between the rack displacing in accordance with the displacement when the second casing 31 is opened and the pinion gear 82, and the driving roller 61A or the driven roller 61B displaces to the separation position side, so that the transport roller pair 61 separates from and comes into contact with each other. The transport roller pair 61 can be separated with a simple configuration by utilizing the operating force when the user opens the second casing 31 to clear the jam.

(5) The moving distance of the rack according to opening and closing of the second casing 31 is longer than the distance of the separation and contact of the transport roller pair 61. Therefore, when the second casing 31 is opened, even if a force is needed to release the nip of the transport roller pair 61, the second casing 31 can be opened with a relatively light operating force.

(6) The upper end of the rack 81 is connected to the second casing 31. Therefore, the nip of the transport roller pair 61 is released in conjunction with the operation of opening the second casing 31 even without the second press member that presses the rack 81 in the direction in which the second casing 31 is opened.

(7) The second casing 31 has the pivot shaft disposed along any one side of the upper surface 12A of the first casing 12, and the second casing 31 pivots around the pivot shaft, thereby opening and closing the upper portion of the first casing 12. Therefore, the upper surface of the first casing 12 can be opened by pivoting the second casing 31.

(8) The complex apparatus 11 includes the recording unit 20 accommodating the recording section 41 in the first casing 12, and the reading unit 30 disposed above the recording unit 20 and accommodating the reading section 36, which reads an image from the document D, in the second casing 31. Therefore, in the complex apparatus 11, for example, when copying is performed, even in a case where the jam occurs in the recording unit 20, nipping of the medium M can be released by the transport roller pair 61 in conjunction with the operation of opening the reading unit 30 with respect to the recording unit 20. Therefore, even when the jam occurs when the copying is performed, the medium M can be easily removed. In addition, as compared with a simple cover, since the reading unit 30 is a heavy object accommodating the reading section 36 in the second casing 31, in order to lighten the operation of opening the reading unit 30, the hinge 16 in which the spring is built is provided in the complex apparatus 11. Therefore, although the reading unit 30 is opened against the pressing force of the spring 75, comparatively, the operating force for opening the second casing 31 is relatively small even if a press member is not necessarily added.

(9) Since the displacement mechanism 80 is a mechanical drive type driven by the user in conjunction with the opening and closing operation of the second casing 31, there is no need to provide a power source such as an electric motor, and when the jam occurs, addition of a mechanism for releasing the nipping of the transport roller pair 61 and separating the transport roller pair 61 can be realized at low cost.

(10) Since the rack 81 has a curved shape, a relative positional relationship between the inner surface of the second casing 31 and the upper end portion of the rack 81 does not change in the process of opening and closing the second casing 31. The rack 81 and the second casing 31 can be connected to be fixed.

Second Embodiment

Next, a second embodiment will be described with reference to FIGS. 10 and 11. The second embodiment is different from the first embodiment in the structure of the rack.

Figure 10:
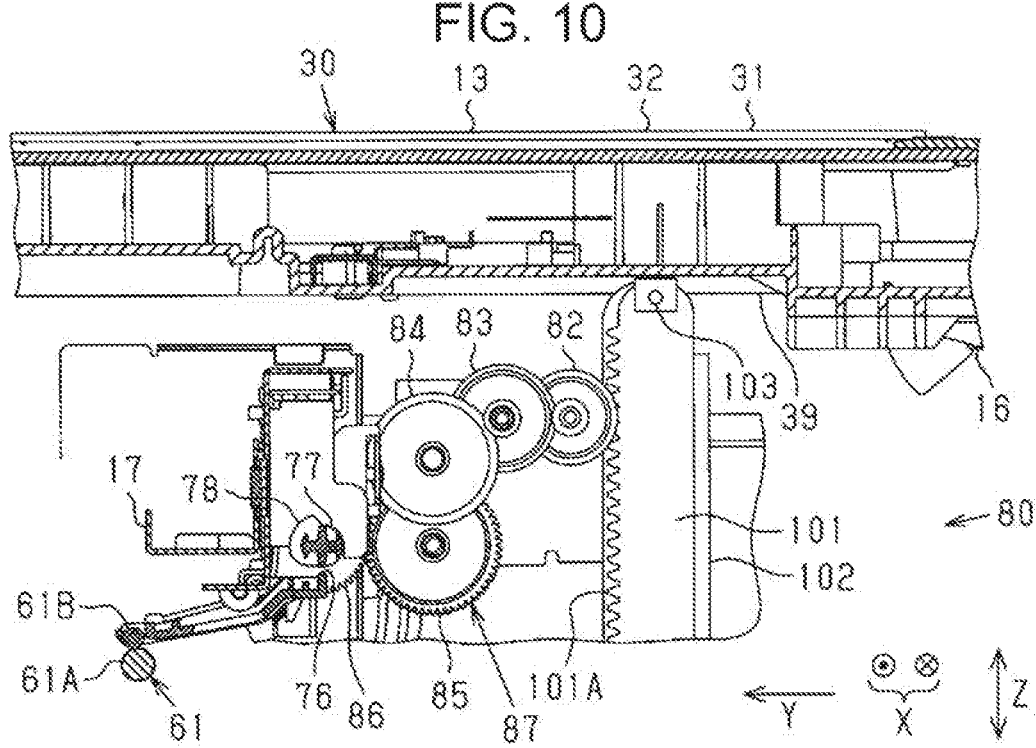
FIG. 10 is a side sectional view illustrating a displacement mechanism in a cover closed state in a second embodiment.

As illustrated in FIG. 10, a rack 101 has a shape extending straight in a straight line, and a tooth portion 101A is formed on one side edge in a longitudinal direction. In a state in which the tooth portion 101A meshes with a pinion gear 82, the rack 101 is disposed in a direction in which the longitudinal direction thereof matches the vertical direction Z.

The rack 101 is guided by a rail 102 extending in the vertical direction Z and vertically moves while keeping a state in which the tooth portion 101A meshes with the pinion gear 82. An upper end portion of the rack 101 is connected to an inner surface of a second casing 31 via a connecting portion 103. The inner surface of the second casing 31 is provided with a rail 39 capable of guiding the connecting portion in a pivot radius direction of the second casing 31.

Figure 11:
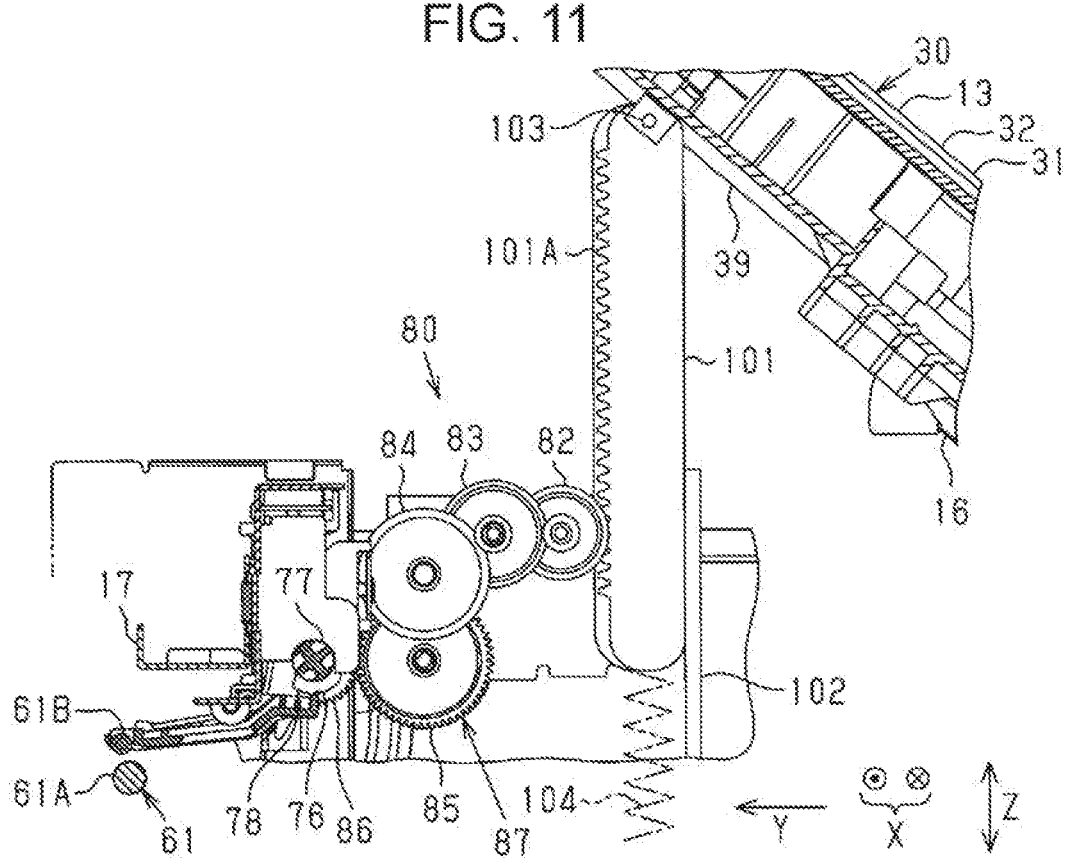
FIG. 11 is a side sectional view illustrating the displacement mechanism in a cover open state.

Therefore, as illustrated in FIG. 11, when the user opens the second casing 31, the connecting portion 103 of the upper end portion of the rack 101 moves in the pivot radius direction of the second casing 31 along the rail 39, so that the rack 101 moves upward while holding a posture at which the longitudinal direction matches the vertical direction Z.

The rack 101 moves upward in conjunction with the opening operation when opening the cover, so that the pinion gear 82 meshing with the rack 101 rotates and a cam shaft 77 rotates via a gear mechanism 87. As a result, a cam follower 76 of a holding member 74 is pressed downward by an eccentric cam 78, and is disposed at a release position at which a driven roller 61B is separated from a driving roller 61A. In this way, the transport roller pair 61 is switched from the nipping state illustrated in FIG. 10 to the separation state illustrated in FIG. 11.

In addition, as illustrated in FIG. 11, a spring 104 may be provided as an example of the second press member indicated by a two-dot chain line in the same drawing for pressing the rack 101 in a direction in which the second casing 31 is opened, that is, pressing the second casing 31 upward in the example. In a case of the configuration, even when the second casing 31 is opened against a pressing force of a spring 75, when opening the second casing 31, a force in the opening direction is assisted by a pressing force of the spring 104, so that it is possible to avoid that the operation becomes heavy.

As described above, according to the second embodiment, in addition to obtaining the same effects (1) to (9) as in the first embodiment, the following effects can be obtained.

(11) The spring 104 is provided as an example of the second press member for pressing the rack 101 in the direction in which the second casing 31 is opened. Therefore, the rack 101 is in a state of being pressed by the pressing force of the spring 104 in the direction in which the second casing 31 is opened, so that the operating force for opening the second casing 31 is relatively small even in a configuration in which the transport roller pair 61 is separated by utilizing the operating force when the second casing 31 is opened.

Third Embodiment

Next, a third embodiment will be described with reference to FIGS. 12 to 14. In the third embodiment, even when a second casing 31 is opened at times other than when the jam occurs, the nip of a transport roller pair 61 is not released.

Figure 12:
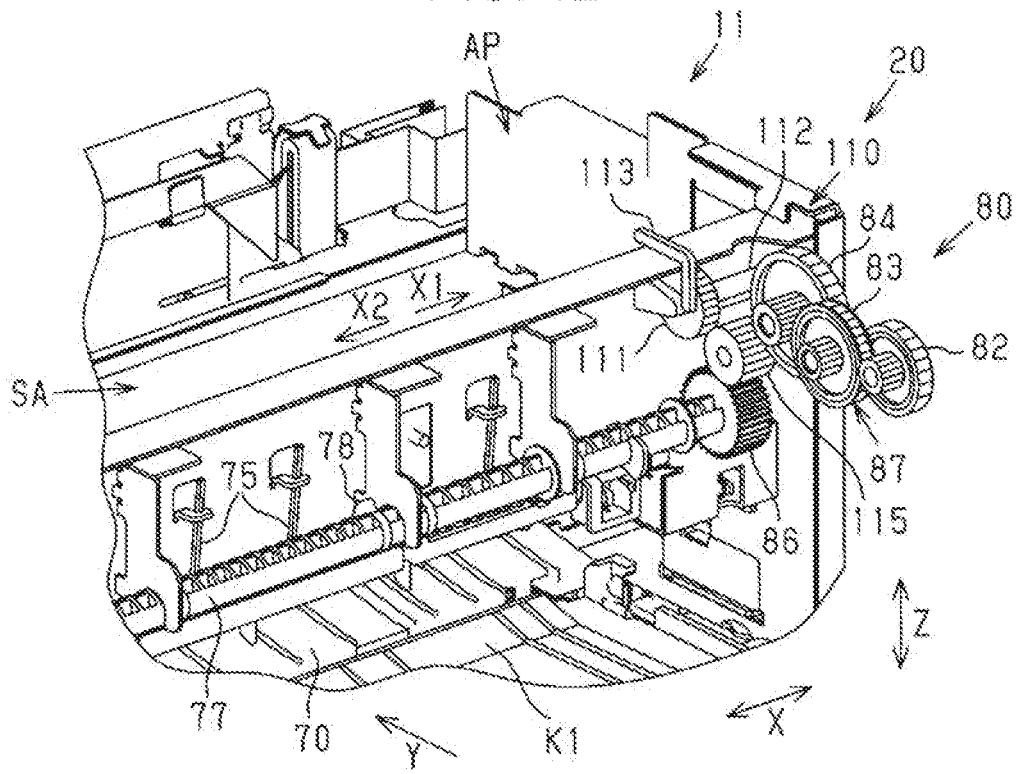
FIG. 12 is a partial perspective view illustrating a displacement mechanism in a clutch disengagement state in a third embodiment.

As illustrated in FIG. 12, a displacement mechanism 80 includes a clutch mechanism 110 that performs engagement and disengagement of power transmission between a rack 81 and a cam shaft 77 in the middle of a power transmitting path of a gear mechanism 87. The clutch mechanism 110 disengages the power transmitting path for transmitting a displacement when the second casing 31 is opened to the transport roller pair 61 when the jam is not detected, and engages the power transmitting path thereof when the jam is detected.

The clutch mechanism 110 includes one switching gear 111, a shaft portion 112 movably supporting the gear 111 in the axial direction, and a switching lever 113 extending from a side surface of the gear 111 toward a scanning region SA. The lever 113 is disposed at a predetermined position one of both sides of the scanning region SA of a carriage 42 (see FIG. 13). In the example illustrated in FIG. 12, the switching lever 113 is located on an opposite home position AP side opposite to a home position HP in a scanning axis X.

Figure 13:
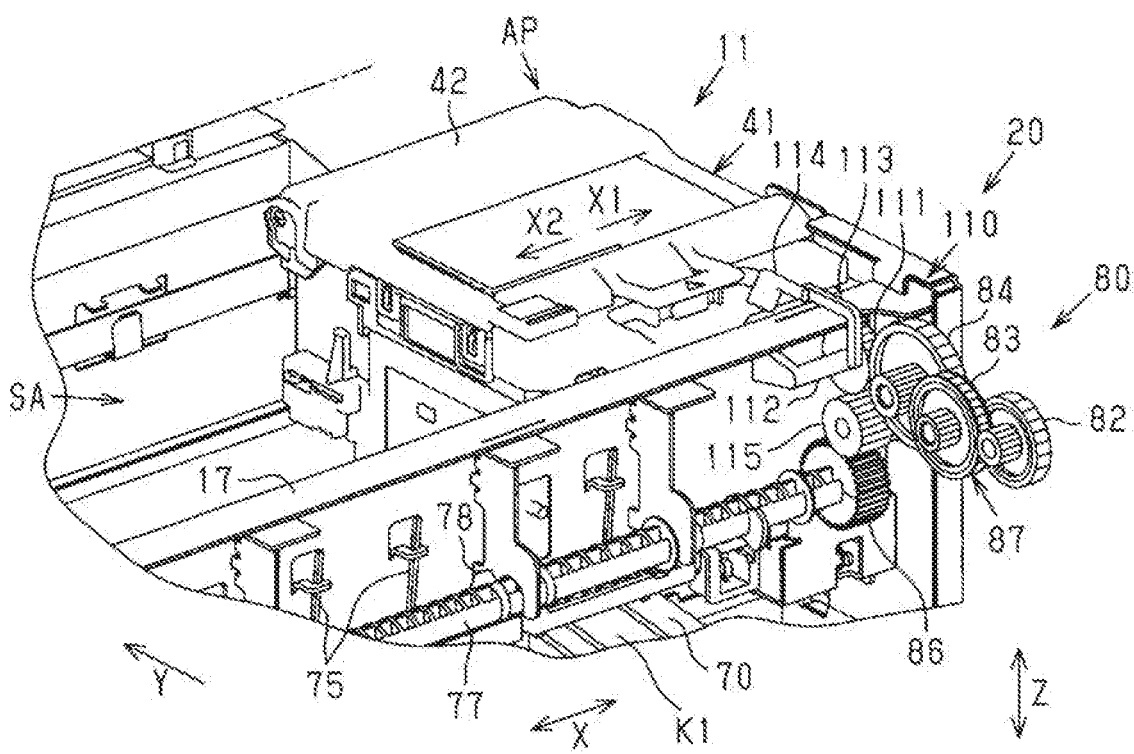
FIG. 13 is a partial perspective view illustrating a displacement mechanism in a clutch engagement state.

As illustrated in FIG. 13, the carriage 42 is provided with an operation lever 114 capable of engaging with the switching lever 113 in the process of moving along the scanning axis X. When the carriage 42 moves to the opposite home position AP side, the operation lever 114 pushes the switching lever 113 to move the clutch gear 111 in a first direction X1 to cause the clutch gear 111 to mesh with another gear 115 constituting the gear mechanism 87. The clutch gear 111 is pressed by a spring (not illustrated) in a second direction X2 opposite to the first direction X1.

Therefore, during the movement of the carriage 42 toward the opposite home position AP, the operation lever 114 pushes the switching lever 113 and is disposed at an engagement position at which the gear 111 meshes with the other gear 115. A mechanism (not illustrated) is provided by which when the gear 111 is disposed at the engagement position, the gear 111 is locked at the position, and when the carriage 42 pushes again the switching lever 113, the lock is released. Therefore, when the carriage 42 pushes again the switching lever 113 in a state in which the gear 111 is disposed at the engagement position, the lock of the gear 111 is released, and when the carriage 42 is separated toward the home position HP side, the gear 111 is moved from the engagement position to the disengagement position by a pressing force of a spring. In this way, the clutch mechanism 110 is switched by moving the gear 111 to the engagement position at which the gear 111 meshes with the other gear 115, and the disengagement position at which the gear 111 does not mesh with the other gear 115 by the operation of the carriage 42. Moreover, a pinion gear 82 constituting the gear mechanism 87 meshes with the rack 81 of the first embodiment or the rack 101 of the second embodiment.

Figure 9:
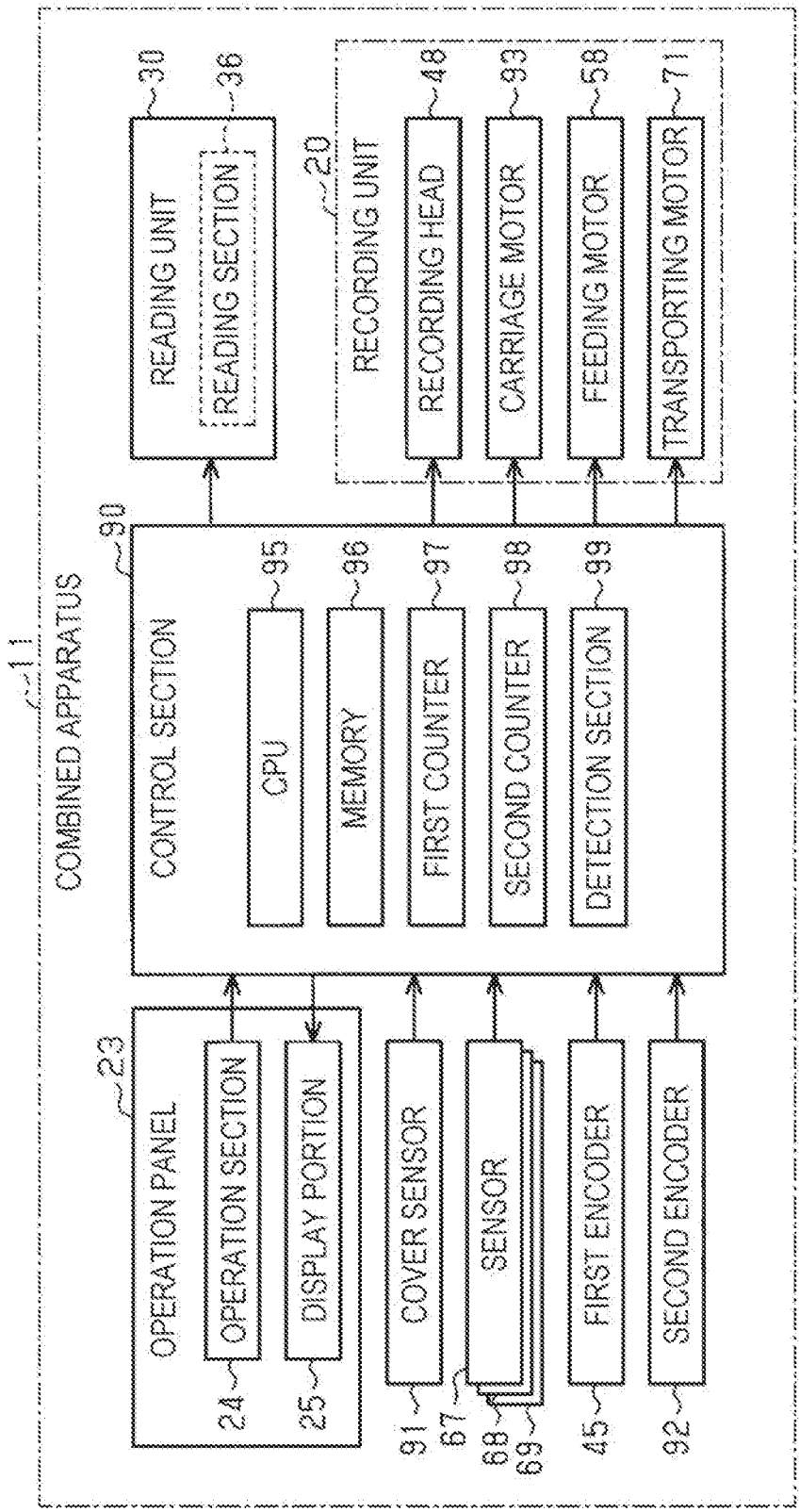
FIG. 9 is a block diagram illustrating electric configurations of the complex apparatus.

The memory 96 of the control section 90 illustrated in FIG. 9 stores a program illustrated in a flowchart of FIG. 14. The CPU 95 executes the program illustrated in FIG. 14 so that the control section 90 performs the release control of the transport roller pair 61.

Hereinafter, an operation of the complex apparatus 11 of the third embodiment will be described with reference to FIG. 14. There are a case where the user opens the second casing 31 when the jam occurs, and a case where the user opens the second casing 31 for the purpose of replacing the ink cartridge on the carriage 42 or injecting ink into a tank on the carriage 42 when running out of ink occurs. Moreover, there is a case where the user erroneously opens the second casing 31 during printing. In a case where the second casing 31 is opened during printing, the cover sensor 91 detects this and printing is stopped. In addition, there is also a model in which printing is interrupted when running out of ink occurs during printing and a message prompting replacement of the ink cartridge or replenishment of ink is displayed on the display portion 25. In this case, when the nip of the transport roller pair is released during the printing, the position of the medium M slightly shifts. Shifting of the position of the medium M during the printing causes deterioration of printing quality. Therefore, in the embodiment, when the second casing 31 is opened at times other than when the jam occurs, the displacement mechanism 80 does not function. That is, when the second casing 31 is opened when the jam occurs, the displacement mechanism 80 functions.

In step S11, the control section 90 determines whether or not the jam is detected. The control section 90 detects the jam, by which the transport section 47 including the transport roller pair 61 cannot transport the medium M, based on the detection state of the sensor 68 and the transport amount of the medium M grasped from the pivot amount of the transporting motor 71. When the medium M is fed by driving of the feeding motor 58, although a sufficient driving amount for completion of feeing the medium M is driven, when the sensors 67 and 68 do not detect the medium M, it is determined that the jam occurs during feeding. In addition, when the medium M is discharged by driving of the transporting motor 71, although a sufficient driving amount more than the rotation amount required for completion of discharging the medium M is driven, when the sensors 67 and 68 detect the medium M, it is determined that the jam occurs during discharging. In addition, when the carriage 42 moves for printing, in a case where a current value of the carriage motor 93 exceeds a threshold and an excessive load applied to the carriage 42 is detected, it is determined that the jam occurs caused by the carriage 42 coming into contact with the medium M. When the jam is detected, the control section 90 proceeds to step S12 and when the jam is not detected, the routine is terminated. For example, the control section 90 may have a configuration in which a jam detecting process is executed during printing, and when the jam is detected in the jam detecting process, an event may be activated to execute a process from step S12.

In step S12, the control section 90 performs the clutch engagement. That is, the control section 90 drives the carriage motor 93 to move the carriage 42 from the home position HP to the clutch switching position on the opposite home position side, and the switching lever 113 is pressed by the operation lever 114 to perform the pressing operation from the release position to the engagement position. The switching lever 113 is pushed by the operation lever 114 to establish an engagement of the clutch mechanism 110. The switching gear 111 is moved from the disengagement position to the engagement position by the clutch engaging operation so as to mesh with the other gear 115 constituting the gear mechanism 87. Moreover, in a case where the cause of the jam is due to the contact between the carriage 42 and the medium M, in a case where the moving direction of the carriage 42 when the jam occurs is a direction toward the clutch switching position, since there is a concern that the medium M is brought into more severe jam state, it is preferable not to perform the switching operation to the clutch engagement state by the carriage 42.

In step S13, the control section 90 displays the occurrence of the jam on the display portion 25. For example, a message including that the jam occurs and the jam occurrence place is displayed on the display portion 25. The user opens the second casing 31 formed of the reading unit 30 and removes the medium M on the transport path to clear the jam. The user opens the second casing 31 to clear the jam and closes the second casing 31 when the jam is cleared. After clearing the jam, in order to notify the complex apparatus 11 of that effect, a designated button of the operation section 24 is operated.

In step S14, the control section 90 determines whether or not the cover opening is detected. That is, the control section 90 determines whether or not a detection signal when the cover is opened is input from the cover sensor 91. When the cover opening state is not detected, it stands by as it is until the cover opening state is detected, and when the cover opening state is detected, the procedure proceeds to step S15.

In step S15, the control section 90 determines whether or not cover closing is detected. That is, the control section 90 determines whether or not a signal when the cover is closed is input from the cover sensor 91. When the opening state of the second casing 31 is not detected, it stands by as it is until the opening state is detected, and when the closed state of the second casing 31 is detected, the procedure proceeds to step S16.

In step S16, the control section 90 determines whether or not there is a button operation. That is, the control section 90 determines whether or not the designated button to be operated by the user is operated after the jam clearance. When the button is operated, the procedure proceeds to step S17, and when the button is not operated, it stands by as it is until the operation is performed.

In step S17, the control section 90 performs disengagement of the clutch. That is, the control section 90 drives the carriage motor 93 to move the carriage 42 to the clutch switching position, and the pressing operation of the switching lever is performed by the lever. When the switching lever is pressed, so that locking of a lock mechanism (not illustrated) is released, and the switching gear is moved from the engagement position to the disengagement position by the pressing force of the spring (not illustrated). Therefore, the clutch disengages power transmission.

Therefore, when the user operates the button after the jam is cleared, the clutch disengages power transmission. Therefore, at times other than when the jam occurs, even when the cover is opened and closed during printing, or even when printing is temporarily interrupted, if the cover is closed, the printing is restarted. In this case, when the second casing 31 is opened, the transport roller pair is in the nip state in which the medium M is nipped during printing. For example, when the nip state of the transport roller pair 61 is released during printing, the position of the medium M in the transporting direction Y is slightly shifted during the nip release, and when the transport roller pair 61 returns to the nip state in which the medium M is nipped again, the medium M is somewhat shifted from the original position. However, in the third embodiment, even when the cover is opened at times other than when the jam occurs, the transport roller pair 61 is held in the nip state in which the medium M is nipped, so that even when the printing is interrupted by opening the second casing 31 during printing, the second casing 31 is closed, and then printing is restarted, shifting is unlikely to occur at the printing position at the time of restarting of printing.

As described above, according to the third embodiment, in addition to obtaining the same effects (1) to (11) as in respective embodiments, the following effects can be obtained.

(12) The control section 90 includes the detection section 99 detecting the jam of the medium M. The displacement mechanism 80 includes the clutch mechanism 110 which disengages the power transmitting path for transmitting the displacement when the second casing 31 is opened to the transport roller pair 61 when the jam is not detected, and engages the power transmitting path for transmitting the displacement when the second casing 31 is opened to the transport roller pair 61 when the jam is detected. Therefore, when the jam does not occur, even when the second casing 31 is opened, the transport roller pair 61 is in the nipped position, so that even when the user opens the second casing 31 for reasons other than the jam during recording, since the medium M is nipped by the transport roller pair 61, the nip of the medium M is temporarily released, and thereby it is possible to avoid deterioration in recording quality due to positional shift.

(13) The complex apparatus 11 includes the transport section 47 including the roller pair 61 for transporting the medium M, and the carriage 42 including the recording section 41 as an example of the processing section and being capable of moving along the scanning axis X intersecting the transporting direction Y of the medium M for performing recording as an example of a process on the medium M. The clutch mechanism 110 is mechanically switched by utilizing the movement of the carriage 42 by the power of the existing carriage motor 93. Therefore, since the clutch mechanism 110 is driven by utilizing the existing power source of the complex apparatus 11, it is not necessary to add a dedicated power source.

Fourth Embodiment

Next, a fourth embodiment will be described with reference to FIG. 15. Similar to the third embodiment, in the fourth embodiment, at times other than when the jam occurs, even when a second casing 31 is opened, the nip of a transport roller pair 61 is not released. A configuration of a clutch mechanism and a power source for switching the clutch mechanism are different from those in the third embodiment. The other configurations and control contents are the same as those in the third embodiment. In the third embodiment, the clutch mechanism 110 is mechanically switched by utilizing the operation of the carriage 42 being moved by the carriage motor 93 as the power source, but in the fourth embodiment, a clutch mechanism 120 is switched by utilizing power of a transporting motor 71 that is a power source of a transport section 47.

As illustrated in FIG. 15, a displacement mechanism 80 includes the clutch mechanism 120 in the middle of a power transmitting path of a gear mechanism 87. The clutch mechanism 120 disengages the power transmitting path for transmitting the displacement when a second casing 31 is opened to a transport roller pair 61 when the jam is not detected, and engages the power transmitting path when the jam is detected. The clutch mechanism 120 includes one switching gear 121 and a swingable arm 122 supporting the gear 121.

The switching gear 121 includes a first gear portion 121A having a large diameter supported by the arm 122, and a second gear portion 121B having a small diameter, which is coaxial with the first gear portion 121A, and freely rotatable. The first gear portion 121A meshes with a driving gear 123 which is rotated by power of a transporting motor 71. The first gear portion 121A pivots the arm 122 in a direction corresponding to the rotation direction thereof.

In addition, the driving gear 123 meshes with a gear 124 provided on a shaft portion of a driving roller 61A. The gear 124 is attached to a shaft portion of the driving roller 61A, for example, via a one-way clutch. Therefore, the gear 124 rotates together with the driving roller 61A only in one direction when the medium M is transported, and idly rotates with respect to the shaft portion of the driving roller 61A in the reverse direction. As illustrated in FIG. 15, the second gear portion 121B of the switching gear 121 is capable of meshing with another gear (not illustrated) constituting a gear mechanism 87 when the arm 122 pivots in a first direction R1.

When the transporting motor 71 is driven to rotate in the forward direction when the medium M is transported, the driving gear 123 rotates in the forward direction, and the gear 124 meshing with the driving gear 123 rotates in the forward direction, so that the driving roller 61A rotates in the forward direction. In addition, when the transporting motor 71 is driven to rotate in the forward direction, the first gear portion 121A of the switching gear 121 meshing with the driving gear 123 rotates in the forward direction, so that the arm 122 pivots in the first direction R1 and the switching gear 121 is disposed at the disengagement position illustrated in FIG. 15. When the switching gear 121 is at the disengagement position, the second gear portion 121B thereof is separated from the gear mechanism 87. As a result, the clutch mechanism 120 disengages power transmission.

On the other hand, when the transporting motor 71 is driven to rotate in the reverse direction, the driving gear 123 rotates in the reverse direction, but the driving roller 61A does not rotate in the reverse direction by a function of the one-way clutch. In addition, when the transporting motor 71 is driven to rotate in the reverse direction and the driving gear 123 rotates in the reverse direction, the first gear portion 121A of the switching gear 121 rotates in the reverse direction, so that the arm 122 pivots from the disengagement position illustrated in FIG. 15 in a second direction R2 opposite to the first direction R1, and the switching gear 121 is disposed at the engagement position illustrated in FIG. 16. As a result, the second gear portion 121B of the switching gear 121 meshes with another gear (not illustrated) constituting the gear mechanism 87. That is, when the transporting motor 71 is driven to rotate in the reverse direction, the driving roller 61A does not rotate and the clutch mechanism 120 can be switched from the disengagement position to the engagement position. Moreover, the clutch mechanism 120 may be constituted of, for example, a cam mechanism, a planetary gear mechanism, or the like.

In addition, a shaft of the switching gear 121 is connected to the arm 122 via a friction clutch (not illustrated). When the transporting motor 71 is driven to rotate in the forward direction, if the arm 122 pivots to the disengagement position to abut against a stopper (not illustrated), the engagement of the friction clutch is disengaged, and further pivot of the arm 122 is restricted. Therefore, when the transporting motor 71 is driven to rotate in the forward direction during printing, the clutch mechanism 120 maintains the disengagement state. In addition, similar to the third embodiment, the control section 90 includes a detection section 99 illustrated in FIG. 9 for detecting the jam of the medium M. When the detection section 99 detects the jam, the control section 90 urgently stops the print operation and the transporting motor 71 is driven to rotate in the reverse direction to establish an engagement of the clutch mechanism 120, and when the jam is not detected, the transporting motor 71 is not driven to rotate in the reverse direction, and the clutch mechanism 120 is maintained in the disengagement state. Moreover, when the jam is detected, the control section 90 urgently stops the print operation and displays the occurrence of the jam on the display portion 25, and then in a case where the button operation that the jam is cleared is received, the transporting motor 71 is driven to rotate in the forward direction by a predetermined amount to disengage the engagement of the clutch mechanism 120.

Moreover, as illustrated in FIG. 15, a shaft end portion of the driving roller 61A is provided with a second encoder 92. In addition, a pulley 125 is pivotally supported on a frame 17, and a timing belt 126 wound around the pulley 125 extends along the scanning axis X. The carriage 42 is fixed to a part of the timing belt 126 and the timing belt 126 is rotated by the power of the carriage motor 93 to move along the scanning axis X.

The control section 90 executes the routine illustrated in FIG. 14 similar to that in the third embodiment. The control section 90 holds the clutch mechanism 120 in the disengagement state when the detection section 99 is not in the state of detecting the jam. Therefore, when the second casing 31 is opened, the rack 81 moves upward, but an opening operation force is not transmitted to the cam shaft 77. As a result, the roller pair 61 is maintained in the nip state. On the other hand, when the detection section 99 detects the jam, the control section 90 stops the printing operation and the transporting motor 71 is driven to rotate in the reverse direction. As a result, the clutch mechanism 120 is switched from the disengagement state to the engagement state without rotating the transport roller pair 61 that nips the jammed medium M. Therefore, when the user opens the second casing 31 to remove the jammed medium M, the rack 81 moves upward in conjunction with the opening operation at this time, so that the cam shaft 77 rotates via the gear mechanism 87 and the nip state of the roller pair 61 is released. Therefore, it is easy for the user to remove the jammed medium M.

According to the fourth embodiment as described above in detail, in addition to obtaining the same effects (1) to (10) as in the first embodiment, the same effect (11) as in the second embodiment, and the same effect (12) as in the third embodiment, the following effects can be obtained.

(14) The complex apparatus 11 includes the transport section 47 including the roller pair 61 transporting the medium M, and the recording section 41, and includes the carriage 42 capable of moving along the scanning axis X intersecting the transporting direction Y of the medium for executing recording on the medium M. Since the clutch mechanism 120 is switched by utilizing the power of the power source of the transport section 47, it is not necessary to add a dedicated power source. In addition, in a case where the carriage 42 comes into contact with the medium M and the jam occurs, when the carriage 42 is moved, there is a concern of making the jam worse. However, in the example, since the clutch mechanism 120 is switched from the disengagement state to the engagement state by driving of the transporting motor 71, which does not transport the medium M, to rotate in the reverse direction, there is no concern that the jam is severe due to the engagement operation of the clutch mechanism 120.

Moreover, the embodiment may be modified as illustrated in the following modification examples.

In the first embodiment and the third embodiment, the second press member for pressing the rack 81 upward may be provided.

The medium processing apparatus is not limited to the complex apparatus 11, but may be a printer without the reading unit 30. This type of printer includes a casing constituting a printer body, and a cover capable of opening and closing with respect to the casing 12 for removing the medium M when the jam occurs. In this case, the casing constituting the printer body corresponds to the first casing and the cover corresponds to the second casing. Moreover, the second casing is not limited to a configuration provided to be capable of opening and closing on the upper surface of the first casing 12, but may be provided to be capable of opening and closing with respect to the side surface of the first casing 12. For example, the second casing 31 may be provided to be capable of opening and closing on the front surface that is the side surface of the first casing 12 on the discharge port 26 side, or the back surface that is the side surface of the first casing 12, on which the feeding path of the medium M can be exposed.

In each embodiment described above, the tooth portions 81A and 101A of the racks 81 and 101 may directly mesh with the gear 86 of the cam shaft 77.

In the third embodiment, the clutch mechanism is not limited to a system in which the switching gear is slid in the axial direction. For example, a system, in which the switching gear is directly moved or rotated in a direction intersecting the shaft thereof, may be provided.

In the third embodiment and the fourth embodiment, the clutch mechanism may not include a gear. For example, a clutch, which is switched by power of one of the carriage motor 93, the feeding motor 58, and the transporting motor 71, may be interposed on the shaft of the gear constituting the gear mechanism. As the clutch, a friction clutch may be provided.

The displacement mechanism is not limited to the configuration including the rack-and-pinion mechanism as long as the transport roller pair 61 can be displaced between the contact position and the separation position in conjunction with the opening and closing operation of the second casing 31. For example, it may be a protrusion protruding from the second casing 31. The protrusion displacing according to the opening and closing operation of the second casing 31 may rotate the gear or the cam shaft 77 constituting the displacement mechanism.

In the rack-and-pinion mechanism, the driving roller 61A may be moved in place of the driven roller 61B, or both the driving roller 61A and the driven roller 61B may be displaced.

In each embodiment described above, the racks 81 and 101 may be provided on both sides in the width direction X in the first casing 12.

In each embodiment described above, in place of or in addition to the transport roller pair 61, another roller pair may be displaced between the separation position and the contact position in conjunction with the opening and closing operation of the second casing 31, and the roller pair may be displaced from the contact position to the separation position in conjunction with the operation of opening the second casing 31. For example, a displacement mechanism for displacing the second transport roller pair 66 may be provided, or a displacement mechanism for displacing one or both the discharging roller pairs 62 and 63 may be provided.

In the embodiments described above, the medium M is not limited to the sheet, but may be a film, a cloth, a resin sheet, a laminate sheet, a metal foil, or the like.

The recording unit 20 of the complex apparatus 11, or the printing apparatus as an example of the medium processing apparatus is not limited to an ink jet type printer, but may be an electrophotographic printer, a dot impact type printer, a thermal transfer type printer, or a textile printing apparatus. In addition, the medium processing apparatus may be any of a serial printer, a lateral type printer, a line printer, and a page printer. Furthermore, the medium processing apparatus has the recording function of performing the process of recording on the medium, but the process is not limited to the recording, and another process may be performed. For example, it may be an image reading apparatus such as a scanner having a reading section that performs a reading process for reading the document.

Technical concepts grasped from the embodiments and the modification examples are described below together with the effects.

In a medium processing apparatus, a processing section performing a process on a sheet-like medium; a roller pair that includes a driving roller and a driven roller, and transports the medium in a transport path including a region in which the processing section performs a process; a first casing accommodating the processing section and the roller pair; a second casing being capable of closing and opening with respect to the first casing; and a displacement mechanism for displacing the roller pair to a separation position and a contact position are provided. The displacement mechanism displaces the roller pair from the contact position to the separation position in conjunction with an operation of opening the second casing.

According to the configuration, when the jam of the medium occurs, when the user opens the second casing for removing the jammed medium, the roller pair displaces from the contact position to the separation position in conjunction with the operation of opening the second casing. Therefore, the user can relatively simply remove the medium under a state in which the nip of the medium is cleared by the roller pair. Therefore, when the jam occurs, removing work of the medium can be easily performed by opening the second casing with respect to the first casing.

In the medium processing apparatus, it is preferable that the displacement mechanism displaces the roller pair from the separation position to the contact position in conjunction with an operation of closing the second casing.

According to the configuration, after the user removes the jammed medium, the roller pair displaces from the separation position to the contact position in conjunction with the operation of closing the second casing. Therefore, when the process is performed on the medium thereafter, the medium can be transported by the roller pair.

In the medium processing apparatus, it is preferable that a first press member pressing the roller pair toward a contact position side is further provided and when the second casing is opened, the displacement mechanism displaces the roller pair to the separation position against a pressing force of the first press member.

According to the configuration, when the user opens the second casing, the roller pair can be separated against the pressing force of the first press member, and when the user closes the second casing, the medium can be nipped by an appropriate nipping pressure according to the pressing force of the first press member.

In the medium processing apparatus, it is preferable that a detection section detecting a jam of the medium is further provided, and the displacement mechanism includes a clutch mechanism that disengages a power transmitting path transmitting a displacement when the second casing is opened to the roller pair when a jam is not detected, and engages the power transmitting path when the jam is detected.

According to the configuration, when the jam is not detected, even when the second casing is opened, the roller pair is in the nipped position, so that even when the user opens the second casing for reasons other than the jam in the middle of recording, since the medium M is nipped by the roller pair, it is possible to avoid deterioration in recording quality due to positional shift of the medium. On the other hand, when the jam is detected, since the power transmitting path is engaged by the clutch mechanism, when the second casing is opened, the roller pair is disposed at the separation position, so that when the user opens the second casing for the purpose of clearing the jam, the medium is not in a state of being nipped by the roller pair. Therefore, the medium can be relatively simply removed to simply clear the jam.

In the medium processing apparatus, it is preferable that a transport section including the roller pair transporting the medium is further provided, the processing section includes a carriage being capable of moving in a moving direction intersecting a transporting direction of the medium for performing a process to the medium, and the clutch mechanism is switched by a power source of the carriage or a power source of the transport section.

According to the configuration, since the clutch mechanism is driven by utilizing the existing power source of the medium processing apparatus, it is not necessary to add a dedicated power source.

In the medium processing apparatus, it is preferable that the displacement mechanism includes a rack displacing in conjunction with an operation of opening and closing the second casing, and a pinion gear meshing with the rack, the roller pair includes a driving roller and a driven roller, a holder holding the driven roller so as to be capable of contacting and separating with respect to the driving roller is provided, and the displacement of the rack is transmitted to the holder via the pinion gear, so that the displacement mechanism displaces the roller pair to the separation position and the contact position.

According to the configuration, when the rack displaces in conjunction with the operation when the user opens the second casing, the displacement of the rack is transmitted to the holder via the rotation of the pinion gear meshing with the rack, and the driven roller held by the holder displaces to the separation position, so that the roller pair separates and comes into contact with each other. The roller pair can be separated with a simple configuration by utilizing the operating force when the user opens the second casing to clear the jam.

In the medium processing apparatus, it is preferable that a moving distance of the rack according to opening and closing of the second casing is longer than a separation and contact distance of the roller pair.

According to the configuration, the displacement mechanism performs the deceleration function. Therefore, even if a force for releasing the nip of the roller pair is added as an operating force when the user opens the second casing, the second casing can be opened with a relatively light operation force.

In the medium processing apparatus, it is preferable that a second press member pressing the rack in a direction in which the second casing is opened.

According to the configuration, since the rack is pressed in a direction in which the second casing is opened by the pressing force of the second press member, even if the roller pair is separated by utilizing the operating force when the second casing is opened, the operating force when the second casing is opened is relatively small.

In the medium processing apparatus, it is preferable that the rack has an upper end connected to the second casing.

According to the configuration, even if the second press member, which presses the rack in the direction in which the second casing is opened, is not necessarily provided, the nip of the roller pair can be released in conjunction with the operation of opening the second casing.

In the medium processing apparatus, it is preferable that the second casing includes a pivot shaft disposed along any one side of an upper surface of the first casing, and the second casing pivots on the pivot shaft to open and close an upper portion of the first casing.

According to the configuration, the second casing pivots with any one side of the upper surface of the first casing as the pivot shaft, so that the upper surface of the first casing can be opened.

In the medium processing apparatus, it is preferable that the processing section is a recording section performing recording on the medium as a process, and in which the medium processing apparatus is a complex apparatus including a recording unit where the recording section is accommodated in the first casing, and a reading unit that is disposed above the recording unit and accommodates a reading section for reading an image from a document in the second casing.

According to the configuration, in the complex apparatus, for example, when the jam occurs when copying is performed, if the reading unit opens with respect to the recording unit, nipping of the medium by the roller pair can be released. Therefore, the jammed medium can be easily removed.

What is claimed is:

1. A medium processing apparatus comprising:
a processing section performing a process on a sheet-like medium;
a roller pair including a driving roller and a driven roller, and transporting the medium in a transport path including a region in which the processing section performs a process;
a first casing accommodating the processing section and the roller pair;
a second casing configured to close and open with respect to the first casing; and
a displacement mechanism displacing the roller pair to a separation position and a contact position, wherein
the displacement mechanism displaces the roller pair from the contact position to the separation position in conjunction with an operation of opening the second casing.

2. The medium processing apparatus according to claim 1, wherein
the displacement mechanism displaces the roller pair from the separation position to the contact position in conjunction with an operation of closing the second casing.

3. The medium processing apparatus according to claim 1, further comprising:
a first press member pressing the roller pair toward a side of the contact position, wherein
when the second casing is opened, the displacement mechanism displaces the roller pair to the separation position against a pressing force of the first press member.

4. The medium processing apparatus according to claim 1, further comprising:
a detection section detecting a jam of the medium, wherein
the displacement mechanism includes a clutch mechanism that disengages a power transmitting path transmitting a displacement when the second casing is opened to the roller pair when the jam is not detected, and engages the power transmitting path when the jam is detected.

5. The medium processing apparatus according to claim 4, further comprising:
a transport section including the roller pair transporting the medium, wherein
the processing section includes a carriage configured to move in a moving direction intersecting a transporting direction of the medium for performing a process to the medium, and
the clutch mechanism is switched by a power source of the carriage or a power source of the transport section.

6. The medium processing apparatus according to claim 1, wherein
the displacement mechanism includes a rack displacing in conjunction with an operation of opening and closing the second casing, and a pinion gear meshing with the rack,
a holder holding the driven roller so as to be configured to contact and separate with respect to the driving roller is provided, and
the displacement of the rack is transmitted to the holder via the pinion gear, so that the displacement mechanism displaces the roller pair to the separation position and the contact position.

7. The medium processing apparatus according to claim 6, wherein
a moving distance of the rack according to opening and closing of the second casing is longer than a separation and contact distance of the roller pair.

8. The medium processing apparatus according to claim 6, further comprising:
a second press member pressing the rack in a direction in which the second casing is opened.

9. The medium processing apparatus according to claim 6, wherein
the rack has an upper end connected to the second casing.

10. The medium processing apparatus according to claim 1, wherein
the second casing includes a pivot shaft disposed along any one side of an upper surface of the first casing, and
the second casing pivots on the pivot shaft to open and close an upper portion of the first casing.

11. The medium processing apparatus according to claim 1, wherein
the processing section is a recording section performing recording on the medium as a process, and
the medium processing apparatus is a complex apparatus including a recording unit where the recording section is accommodated in the first casing, and a reading unit that is disposed above the recording unit and accommodates a reading section for reading an image from a document in the second casing.

* * * * *